US012782596B2

(12) United States Patent
Alfuraidan et al.

(10) Patent No.: US 12,782,596 B2
(45) Date of Patent: Nov. 3, 2026

(54) SYSTEM AND METHODS FOR SEISMIC VELOCITY IDENTIFICATION USING GRAPHS

(71) Applicant: KING FAHD UNIVERSITY OF PETROLEUM AND MINERALS, Dhahran (SA)

(72) Inventors: Monther Rashed Alfuraidan, Dhahran (SA); Abdullatif Abdulrahman Al-Shuhail, Dhahran (SA); Sherif Mohamed Hanafy Mahmoud, Dhahran (SA); Ibrahim Olatunji Sarumi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 396 days.

(21) Appl. No.: 18/402,202

(22) Filed: Jan. 2, 2024

(65) Prior Publication Data

US 2025/0216568 A1 Jul. 3, 2025

(51) Int. Cl.
*G01V 1/30* (2006.01)
*G01V 1/18* (2006.01)
*G01V 1/34* (2006.01)

(52) U.S. Cl.
CPC .............. *G01V 1/303* (2013.01); *G01V 1/181* (2013.01); *G01V 1/306* (2013.01); *G01V 1/345* (2013.01);
(Continued)

(58) Field of Classification Search
CPC ........ G01V 1/303; G01V 1/181; G01V 1/306; G01V 1/345; G01V 2210/1295;
(Continued)

(56) References Cited

U.S. PATENT DOCUMENTS 11,372,124 B2 6/2022 Zhang
2004/0196738 A1* 10/2004 Tal-Ezer ................. G01V 1/28 367/51
(Continued)

FOREIGN PATENT DOCUMENTS

WO 2004/090573 A2 10/2004
WO 2014/124204 A1 8/2014

OTHER PUBLICATIONS

Alfuraidan et al. ; Approximation of seismic velocities from the spectrum of weighted graphs ; International Journal on Geomathematics 14:5 ; Mar. 13, 2023 ; 13 Pages.
(Continued)

*Primary Examiner* — Lee E Rodak
*Assistant Examiner* — Sangkyung Lee
(74) *Attorney, Agent, or Firm* — Oblon, McClelland, Maier & Neustadt, L.L.P.

(57) ABSTRACT

A method and a system for estimating a seismic velocity of a subsurface layer of a geologic formation is described. A seismic source is configured to direct seismic shots into the geologic formation. Multiple seismic receivers placed at certain distance from the seismic source are configured to receive seismic waves refracted from the subsurface layer, convert the received seismic waves into seismic traces and transmit seismic traces to a signal processing circuitry which identifies a common midpoint of the seismic traces and applies a graph-based computation on at least three seismic traces to identify a second largest eigenvalue corresponding to multiple transmission points within the subsurface layer. The second largest eigenvalue is used in a quartic regression polynomial, which uses the selected seismic traces to determine each coefficient of the quartic regression polynomial in order to identify a velocity of seismic waves and the corresponding material of the subsurface layer.

20 Claims, 18 Drawing Sheets

(52) U.S. Cl.
CPC ................ *G01V 2210/1295* (2013.01); *G01V 2210/1425* (2013.01)

(58) Field of Classification Search
CPC ..... G01V 2210/1425; G01V 2210/614; G01V 2210/6222
See application file for complete search history.

(56) References Cited

U.S. PATENT DOCUMENTS

| | | | | |
|---|---|---|---|---|
| 2021/0072416 | A1* | 3/2021 | Machovoe | G01V 1/288 |
| 2021/0223424 | A1 | 7/2021 | Valensi et al. | |

OTHER PUBLICATIONS

Li ; Advanced signal processing for micro-seismic signal analysis ; PhD Thesis in Electronic and Electrical Engineering, University of Strathclyde, Glasgow ; May 2, 2023 ; 171 Pages.

* cited by examiner

SYSTEM AND METHODS FOR SEISMIC VELOCITY IDENTIFICATION USING GRAPHS

STATEMENT REGARDING PRIOR DISCLOSURE BY THE INVENTORS

Aspects of this technology are described in an article titled "Approximation of seismic velocities from the spectrum of weighted graphs", published in March 2023 *GEM—International Journal on Geomathematics* 14(1), Vo. 14, Article #5, which is incorporated herein by reference in its entirety.

BACKGROUND

Technical Field

The present disclosure is directed to the technical field of seismic activity-based exploration of subsurface layers of earth. More particularly, the present disclosure relates to a system and a method for seismic velocity identification using graphs.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Seismic surveys have a long history of use in understanding the shape and attributes of subsurface formations or layers of the earth. Seismic waves traverse the earth's subsurface at varying speeds, contingent on the material through which they propagate. Following the principles of wave reflection and refraction, seismic waves, upon encountering different types of rock or soil, may undergo partial refraction and reflection. Upon reception of the reflected or refracted waves at the surface, the refracted waves are recorded and analyzed to ascertain likely subsurface structures at various depths in a specific region of the earth's surface. Analysis of seismic surveys can indicate the potential presence of oil, hydrocarbons, or valuable minerals. Additionally, seismic surveys aid in comprehending the wave velocity of seismic waves at different layers of the earth.

These surveys employ one or more sources and one or more receivers to collect information about the phase, amplitude, and velocity of seismic waves as they traverse the layers of the earth. The sources and receivers utilized in a seismic survey are positioned on the earth's surface.

Geological surveying has extensive applications, including determining the location of oil and gas reserves on land and offshore. Conventional practices involve examining surface geological formations and relying on the surveyor's knowledge and experience to determine the locations of underground or subsurface structures likely to contain reserves. A property of the subsurface layer is its density through which a defined velocity of waves travel. Once the wave velocity is determined, the properties of the structure below the earth's surface can be easily identified. Therefore, accurately determining wave velocity is crucial.

There are many methods of determining the wave velocity of the seismic wave through the subsurface layer of the earth. For example, WO2004090573A2 describes seismic imaging of at least two layers using Krylov space expansion. The received signals are stacked, and a velocity analysis is conducted by rearranging the data from shot gather order to common midpoint order (CMP), where each gather consists of traces from shot/receiver pairs that share a common midpoint on the surface. A Hermitian matrix is formed using the Laplacian operator, and the eigenvalues are determined. However, the Hermitian matrix involves computation of a complex square matrix that is equal to its own conjugate transpose. Computing its own conjugate transpose involves a complex procedure, which increases the computational cost of the overall system.

US20210223424A1 describes the generation of an image of the subsurface of an area of interest using seismic data. Seismic sources from the seismic survey apparatus are utilized, and seismic wavefields are recorded at the surface with a plurality of seismic sensors, such as hydrophones or geophones. The invention further discloses forming a seismic velocity parameter model and determining the minimum value of a cost function. A scalar wave equation is written, which is related to the wave propagation velocity and includes a Laplacian operator. However, the process of determining the velocity parameter using the cost function involves complex procedures, which simultaneously impose a computational burden on the system hardware.

U.S. Ser. No. 11/372,124B2 describes determining the velocity within a near surface region of a substrate using seismic sources and receivers. The system and method associated with the reference includes iteratively picking seismic first breaks and conducting imaging of the near-surface velocity structures in an iterative fashion. A velocity model is used which includes a Laplacian operator. However, the reference requires the computation of travel times in multiple domains, that is, Common Shot Gather (CSG), Common Receiver Gather (CRG), Common-Midpoint Panel (CMP), or Common-Offset Gather (COG)), which increases the complexity of the computation procedure.

WO2016124204A1 describes formulating a linear system of equations for an implicit function with respect to a mesh that represents a geologic environment. However, the process of forming the linear system and computing the velocity of sublayers is performed using conventional techniques, which increases the computation burden and computation time of the entire process.

A reference proposes to use a weighted graph model to approximate seismic velocity. (See: Monther Rashed Alfuraidan, Abdullatif Al-Shuhail, Sherif M. Hanafy & Ibrahim O. Sarumi, "*Approximation of seismic velocities from the spectrum of weighted graphs*", Springer link, *GEM—International Journal on Geomathematics,* 14, Article number: 5 (2023)). This reference discloses finding the highest value of the absolute value of eigenvalues to calculate the velocity of sublayers. However, using the highest value of eigenvalues in computing the velocity of the sublayers does not yield the exact value of the velocity and may even involve a higher chance of error in the computation.

Each of the aforementioned references suffers from one or more drawbacks hindering their widespread adoption. Accordingly, there is a need of such system or a method to efficiently calculate the velocity of subsurface layers without increasing the computational burden on the overall system.

SUMMARY

In an exemplary aspect of the present disclosure, a system for estimating a seismic velocity of a subsurface layer of a geologic formation is described. The system comprises a seismic source located on a surface layer of the geologic formation. The seismic source is configured to transmit shots of seismic waves into the geologic formation. The system further includes a plurality of seismic wave receivers located on the surface layer of the geologic formation. Each seismic wave receiver is configured to receive seismic waves refracted from a subsurface formation within the geologic layer and convert the secondary seismic waves into seismic traces. The system further includes a transmitter located within each seismic wave receiver. The transmitter is configured to transmit the seismic traces. The system further includes a signal processing circuitry. The signal processing circuitry includes an antenna configured to receive the seismic traces. The signal processing circuitry further includes a signal processing circuitry. The signal processing circuitry is configured to gather and stack the seismic traces. The signal processing circuitry is further configured to determine a common midpoint of the stack of seismic traces. The signal processing circuitry is further configured to determine a velocity of seismic waves of a first subsurface layer of the geologic formation from a geometrical evaluation of direct wave arrivals of the seismic traces. The signal processing circuitry is further configured to select at least three seismic traces. The signal processing circuitry is further configured to determine all combinations of seismic source/seismic wave receiver geometries of each of the three selected seismic traces. The seismic source/seismic wave receiver geometries represent ray paths of a seismic signal as it travels through the first subsurface layer, refracts into a second subsurface layer, reflects from a third subsurface layer, refracts out of the second subsurface layer and is received by one of the seismic wave receivers. The signal processing circuitry is further configured to form a weighted adjacency matrix W from the combinations. The signal processing circuitry is further configured to form a weighted degree matrix $D^{-1}$ from the combinations. The signal processing circuitry is further configured to calculate an inverse $(D^{-1})^{1/2}$ of the weighted degree matrix. The signal processing circuitry is further configured to form a normalized weighted Laplacian matrix $$L_{sym}^{w}$$

by calculating $$L_{sym}^{w}(G) = I - \left(D_w^{-1}\right)^{\frac{1}{2}} W \left(D_w^{-1}\right)^{\frac{1}{2}},$$

where I is an identity matrix. The signal processing circuitry is further configured to calculate eigenvalues of the normalized weighted Laplacian matrix. The signal processing circuitry is further configured to determine which eigenvalue has a second largest absolute value of the eigenvalues. The signal processing circuitry is further configured to select the eigenvalue having the second largest absolute value. The signal processing circuitry is further configured to form a quartic regression polynomial of the eigenvalue having the second largest absolute value. The signal processing circuitry is further configured to calculate a velocity of the seismic waves in a second layer of the geologic formation by fitting data points of the three selected seismic traces to each coefficient of the quartic regression polynomial. The system for estimating the seismic velocity of the subsurface layer of a geologic formation further includes a database of known velocities of seismic wave propagation in materials operatively connected to the signal processing circuitry. The signal processing circuitry is configured to determine a material of the second layer of the geologic formation by matching the velocity of the seismic waves in the second layer to a record in the database of known velocities of seismic wave propagation in materials.

In another exemplary aspect of the present disclosure, a method for estimating a seismic velocity of a subsurface layer of a geologic formation is disclosed. The method includes transmitting shots of seismic waves into the geologic formation with a seismic source located on a surface layer of the geologic formation. The method further includes receiving, by a plurality of seismic wave receivers located on the surface layer of the geologic formation, seismic waves refracted by a subsurface formation within the geologic layer. The method further includes converting, by the plurality of seismic wave receivers, the secondary seismic waves into seismic traces. The method further includes transmitting, by a transmitter located within each seismic wave receiver, the seismic traces. The method further includes receiving, by an antenna connected to a signal processing circuitry, the seismic traces. The method further includes gathering and stacking, by a signal processing circuitry included in the signal processing circuitry, the seismic traces. The method further includes determining a common midpoint of the stack of seismic traces. The method further includes selecting at least three seismic traces. The method further includes determining all combinations of seismic source/seismic wave receiver geometries of each of the three selected seismic traces. The seismic source/seismic wave receiver geometries represent ray paths of a seismic signal as it travels through the first subsurface layer, refracts into a second subsurface layer, reflects from a third subsurface layer, refracts out of the second subsurface layer and is received by one of the seismic wave receivers. The method further includes forming a weighted adjacency matrix W from the combinations. The method further includes forming a weighted degree matrix $D^{-1}$ from the combinations. The method further includes calculating an inverse $(D^{-1})^{1/2}$ of the weighted degree matrix. The method further includes forming a normalized weighted Laplacian matrix $$L_{sym}^{w}$$

by calculating $$L_{sym}^{w}(G) = I - \left(D_w^{-1}\right)^{\frac{1}{2}} W \left(D_w^{-1}\right)^{\frac{1}{2}},$$

where I is an identity matrix. The method further includes calculating eigenvalues of the normalized weighted Laplacian matrix. The method further includes determining which eigenvalue has a second largest absolute value of the eigenvalues. The method further includes selecting the eigenvalue having the second largest absolute value. The method further includes forming a quartic regression polynomial of the eigenvalue having the second largest absolute value. The method further includes calculating a velocity of the seismic waves in a second layer of the geologic formation by fitting data points of the three selected seismic traces to each coefficient of the quartic regression polynomial. The method further includes determining, by the signal processing circuitry, a material of the second layer of the geologic formation by matching the velocity of the seismic waves in the second layer to a record in a database of known velocities of seismic wave propagation in materials.

In another exemplary aspect of the present disclosure, a method for conducting a geologic survey of a subsurface layer of the geologic formation is described. The method includes installing a seismic source on a surface layer of the geologic formation. The seismic source is configured to transmit shots of seismic waves into the geologic formation. The method further includes installing a plurality of seismic wave receivers on the surface layer of the geologic formation. Each seismic wave receiver is configured to receive seismic waves refracted from a subsurface formation within the geologic layer and convert the secondary seismic waves into seismic traces. The method further includes installing a transmitter within each seismic wave receiver. The transmitter is configured to transmit the seismic traces. The method further includes operatively connecting a signal processing circuitry including an antenna to receive the seismic traces. The signal processing circuitry includes signal processing circuitry configured for gathering and stacking the seismic traces. The signal processing circuitry is further configured for determining a common midpoint of the stack of seismic traces. The signal processing circuitry is further configured for selecting at least three seismic traces. The signal processing circuitry is further configured for determining all combinations of seismic source/seismic wave receiver geometries of each of the three selected seismic traces. The seismic source/seismic wave receiver geometries represent ray paths of a seismic signal as it travels through the first subsurface layer, refracts into a second subsurface layer, reflects from a third subsurface layer, refracts out of the second subsurface layer and is received by one of the seismic wave receivers. The signal processing circuitry is further configured for forming a weighted adjacency matrix W from the combinations. The signal processing circuitry is further configured for forming a weighted degree matrix $D^{-1}$ from the combinations. The signal processing circuitry is further configured for calculating an inverse $(D^{-1})^{1/2}$ of the weighted degree matrix. The signal processing circuitry is further configured for forming a normalized weighted Laplacian matrix $$L_{sym}^{w}$$

by calculating $$L_{sym}^{w}(G) = I - (D_w^{-1})^{\frac{1}{2}} W (D_w^{-1})^{\frac{1}{2}},$$

where I is an identity matrix. The signal processing circuitry is further configured for calculating eigenvalues of the normalized weighted Laplacian matrix. The signal processing circuitry is further configured for determining which eigenvalue has a second largest absolute value of the eigenvalues. The signal processing circuitry is further configured for selecting the eigenvalue having the second largest absolute value. The signal processing circuitry is further configured for forming a quartic regression polynomial of the eigenvalue having the second largest absolute value. The signal processing circuitry is further configured for calculating a velocity of the seismic waves in a second layer of the geologic formation by fitting data points of the three selected seismic traces to each coefficient of the quartic regression polynomial. The signal processing circuitry is further configured for determining, by the signal processing circuitry, a material of the second layer of the geologic formation by matching the velocity of the seismic waves in the second layer to a record in a database of known velocities of seismic wave propagation in materials.

The foregoing general description of the illustrative aspects and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
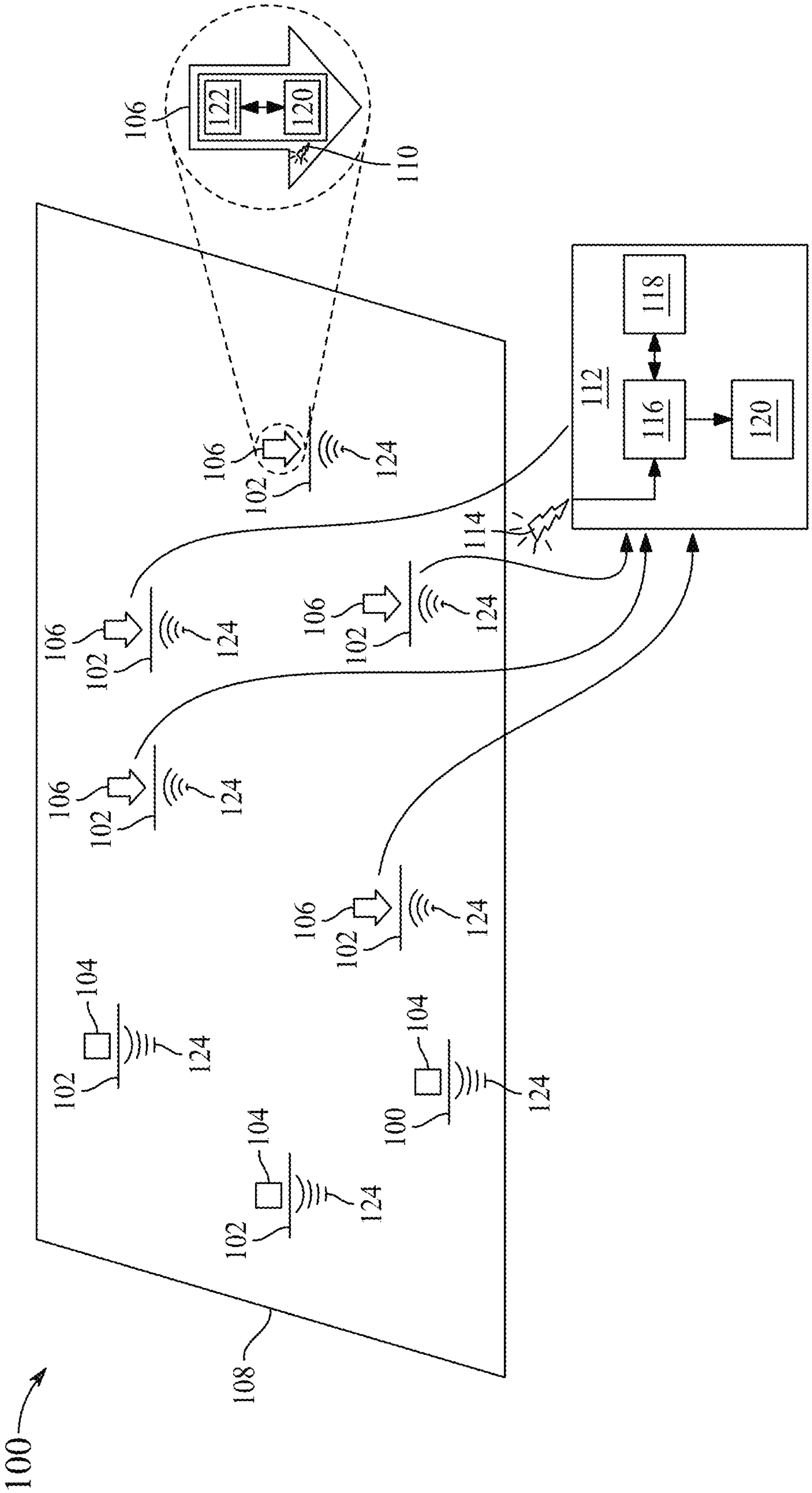
FIG. 1 illustrates a system for estimating a seismic velocity of a subsurface layer of a geologic formation, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Further, the terms "source", "seismic source" and "seismic wave source" represent same terms and used throughout the disclosure synonymously.

Further, the terms "seismic wave receivers", "seismic receivers" and "receiver" represent same terms and used throughout the disclosure synonymously.

Further, the terms "sublayers", "second subsurface", "second sublayers", "subsurface layer" and "second subsurface layer" represent same terms and used throughout the disclosure synonymously.

The present disclosure pertains to a method and system designed for estimating the seismic velocity of a subsurface layer within a geological formation using graph theory. The process involves setting up one or more seismic sources to emit seismic waves on the Earth's surface. Positioned at a specific distance from the seismic source, one or more seismic receivers are configured to capture seismic waves refracted from the Earth's surface. These received seismic waves are then converted into seismic traces and transmitted to a computing unit. Within the computing unit, a signal processing circuitry identifies a common midpoint of the seismic traces and determines the velocity of seismic waves in a first subsurface layer immediately below the surface of the earth using direct waves. Additionally, the signal processing circuitry applies a graph-based computation across the seismic traces to pinpoint the second largest eigenvalue corresponding to one or more transmission points within the subsurface layer. Further, the signal processing circuitry utilizes this second largest eigenvalue in a quartic regression polynomial, fitting data points of the selected seismic trace to each coefficient of the quartic regression polynomial. Consequently, the velocity of seismic waves in a second layer of the geological formation is identified. The signal processing circuitry also determines the material of the second layer by comparing the velocity of seismic waves in the second layer with a record of known velocities of seismic wave propagation in different materials. The detailed description of the method and the system for estimating a seismic velocity of the subsurface layer of the geologic formation is now described in detail in FIG. 1.

FIG. 1 illustrates a system 100 for estimating a seismic velocity of a subsurface layer of a geologic formation 108. The geological formation 108 represents one or more layers or subsurface layers with one or more rock formations below a surface layer 102 of the earth having consistent set of physical characteristics. An experiment related to determining the seismic velocity within the subsurface layer of earth is performed over the geological formation 108 on the surface of the earth 102. The geologic formation includes one or more layers below the surface layer 102 and the seismic velocity in each layer is different. The velocity within a specific layer depends on the height of the specific layer from the earth surface and the type of the material or the geological formation of the specific layer. For example, a subsurface layer may consist of any one of water, sand, shale, rock, schist, gneiss and the like. As such, different subsurface layers have different velocities of seismic waves. Identification of the type of subsurface material or structure is then used to determine whether the subsurface layer contains marketable product, such as water, coal, oil-bearing shale, and the like. Additionally, knowledge of the type of subsurface material or structure is critical in determining equipment, drill type, drill speed and other parameters which must be known in drilling processes.

The system 100 includes a seismic source 104 installed on a surface layer 102 of the geologic formation 108. The seismic source 104 is a device configured to release seismic wave energy or a seismic shot 124 into the earth. The seismic source 104 may be selected from, but not limited to, a sledgehammer, a plasma sound source, a thumper truck, a seismic vibrator, an electromagnetic pulse energy source, a boomer source, a rifle shot directed into the geologic formation or the like. The seismic source 104 may be portable or non-portable. The seismic source 104 is configured to transmit shots of seismic waves into the geologic formation 108 below the surface layer 102. In an aspect of the present disclosure, more than one seismic source 104 may be located on the surface layer 102, as shown in FIG. 1.

The system 100 further includes a plurality of seismic wave receivers 106 (also referred to as seismic receivers 106) located on the surface layer 102 of the geologic formation 108. One or more seismic wave receivers 106 are installed on the surface layer 102 of the geologic formation 108. Each seismic wave receiver 106 is configured to receive seismic waves as secondary seismic waves 124 refracted from a subsurface formation within the geologic layer when the seismic source 104 transmits shots of seismic waves 124. Once the secondary seismic waves 124 are received, each of the seismic wave receivers 106 is configured to convert the secondary seismic waves 124 into one or more seismic traces. Each of the plurality of seismic wave receivers 106 includes a transmitter 110. In an aspect, the plurality of seismic wave receiver 106 may be selected from a hydrophone or a geophone. Further, each of the plurality of seismic wave receivers 106 may additionally include a seismic wave receiver memory 122 to store seismic traces, such that the seismic traces may be accessed in conditions where there is no satellite access. In an aspect of the present disclosure, each seismic wave receiver 106 may have an auto erase function in the seismic wave receiver memory 122 which erases the stored traces after a specific days, for example, after 30 days. Each seismic wave receiver 106 is equipped with a battery or solar energy harvester (not shown), such as a solar panel for the functioning of the seismic wave receiver 106. In another aspect, each seismic wave receiver 106 may be powered by one or more seismic sources 104 using a wired or wireless connection between the seismic wave receiver 106 and the one or more seismic sources 104 while performing the seismic wave-based geologic survey of a site. In another aspect of the present disclosure, each seismic wave receiver 106 may additionally include other supported electronic components, such as RAM, ROM, cache memory, hard disks, input and output devices, a display unit or like, as required while receiving and processing the secondary seismic waves 124 to generate the seismic traces, before transmitting them to a computing unit 112.

The system 100 further includes the computing unit 112. The computing unit 112 includes a receiver, such as an antenna 114 and a signal processing circuitry 116. Once the plurality of seismic wave receivers 106 identifies seismic traces, each seismic wave receiver 106 is configured to transmit the seismic traces using the transmitter 110 to the computing unit 112, such that the computing unit 112 processes the seismic traces by the signal processing circuitry 116 to identify the velocity of the subsurface layer. The transmitter 110 in each seismic wave receiver 106 is configured to transmit seismic traces, and the antenna 114 of the computing unit 112 is configured to receive seismic traces and supply them to the signal processing circuitry 116 of the computing unit 112. The computing unit 112 could be selected from, a laptop, a desktop, a cloud server, a mainframe computer, a cellphone device or any computing device configured to perform large computing operations and having the capability to display the processed data. In an aspect of the present disclosure, the transmitter 110 is configured to wirelessly transfer the seismic traces to the computing unit 112. The technique of the wireless transfer may include, but not limited to Bluetooth, NFC, radio waves-based communication, edge, GPRS, 1G, 2G, 3G, 4G, 5G, 6G, 7G, 8G, 9G, or 10G based communication, Wi-Fi, WAN or alike. In another aspect of the present disclosure, the data transmission of seismic traces from the seismic wave receivers 106 to the seismic source 104 may be executed by a wired connection between the seismic wave receiver 106 and the computing unit 112.

The computing unit 112 further includes database 118 operatively connected to the signal processing circuitry 116. The database 118 includes a plurality of materials of known velocity. The storage of the velocities of seismic wave propagation of known materials is used to identify the type of material once the processing circuitry 116 identifies the velocity of the subsurface. The processing circuitry matches the velocity of the subsurface layer to a material having the same velocity of seismic wave propagation to thus identify the material of the subsurface layer. The computing unit 112 may additionally include an output device 120. The output device 120 may be operatively connected to the signal processing circuitry 116 to display the results processed by the signal processing circuitry 116 to an end user. In an aspect, the computing unit 112 may include other supported components, such as RAM, ROM, cache memory, hard disks, input and output devices, or alike, as required by the signal processing circuitry 116 while processing and displaying the seismic data to an end user. In an aspect, the database 118 is representative of a memory of the computing unit 112. In an aspect, other sections of the memory of the computing unit store various computer related program instructions which, when executed by the signal processing circuitry 116 of the computing unit 112, is configured to estimate the seismic velocity of a subsurface layer of a geologic formation 108.

The system 100 for identifying the velocity of seismic waves in subsurface layer is next described in detail. At least one seismic source 104 is necessary to generate the shot which causes the seismic wave in the geologic formation. However, more than one seismic source 104 may be present while performing the seismic exploration-based activity. In one aspect, the seismic source 104 may be equipped to use a 200-lb accelerated weight drop to generate the seismic energy and transmit shots of seismic waves 124 into the geologic formation 108 over the surface layer 102 on earth. Alternatively, the seismic shot may be generated by a sledgehammer, a plasma sound source, a thumper truck, a seismic vibrator, an electromagnetic pulse energy source, a boomer source or the like. The pattern of the transmission of shots from the seismic source 104 may be executed in two different ways, which are described in detail in FIG. 2A and FIG. 2B.

Figure 2A:
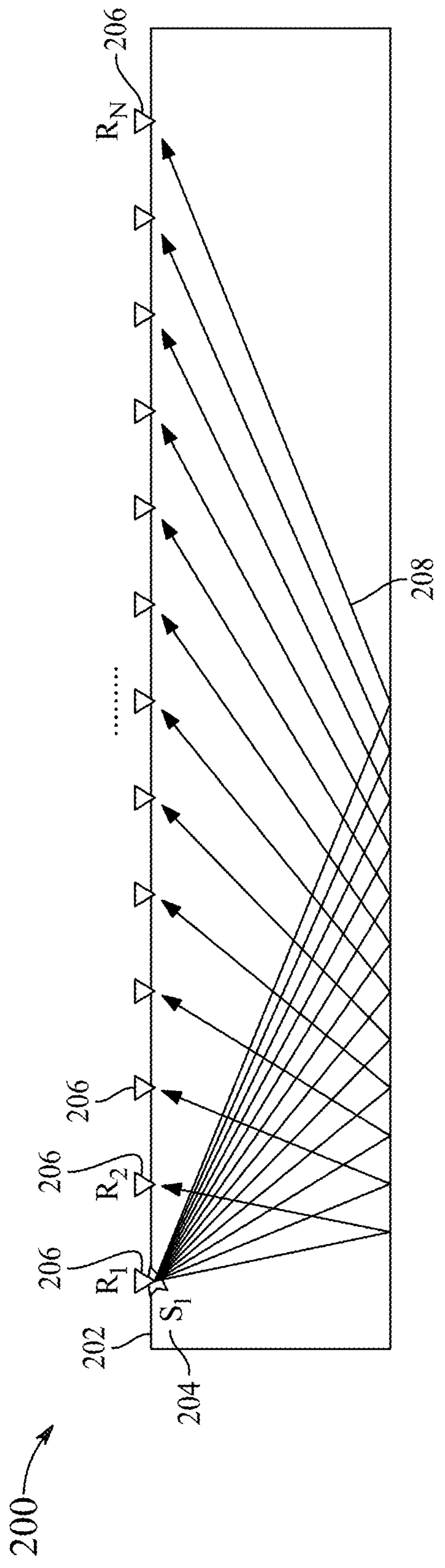
FIG. 2A illustrates a seismic energy transmission shots pattern from a seismic source with configuration of a fixed array of seismic wave receivers, according to certain embodiments.

FIG. 2A illustrates a seismic energy transmission shots pattern 200 from a seismic source with a configuration of a fixed array of seismic wave receivers 206, according to an aspect of the present disclosure. A total 96 seismic wave receivers 206 are placed at 3 m intervals over a surface layer 202 and use a 40-Hz vertical component receiver in each seismic wave receiver 206 which receives P-wave components. A vertical component P-wave is an important source of data in studies of the crust/mantle transfer function for determining earth structure under isolated receivers or under receiver arrays. This waveform illuminates a missing aspect of the wave propagation in receiver function studies that employ only the horizontal components of motion and yields complementary constraints on near-receiver heterogeneity and P-wave propagation. The number of used seismic receivers 206 is not limiting and more or less than 96 seismic wave receivers 106 may be used. All seismic wave receivers 206 are activated. A seismic source S1 204 is initially positioned at a first shot location, for example near a first seismic receiver 206 represented by R1. Subsequently, a seismic shot (represented by a star near a first seismic receiver 206 R1 that is also representative of the seismic shot 124 in FIG. 1) is fired by the seismic source 204. All of the seismic receivers 206, including the first seismic receiver 206 represented by R1, record secondary seismic signals 208, resulting in what is known as a shot gather or one seismic profile. Subsequently, the seismic source 204 is moved to a next location, for example near a second seismic receiver 206 represented by R2. All seismic receivers 206 including the first seismic receiver 206 R1 are again active. The seismic source S1 204 again fires the shot, and a new shot gather is recorded by all seismic receivers 206. Accordingly, the process of shot firing by the seismic source 204, recording the shot gathered by all seismic receivers 206 and moving the seismic source 204 to the next seismic receiver 206 and repeating the shot firing proceeds until all the required shot gathers are collected. Also, to increase the signal-to-noise ratio (SNR) of the recorded data, each shot is recorded using at least 10 stacks, that is, at least 10 different seismic receivers 206 may receive the shot gathered for a single shot fired by the seismic source 204.

Figure 2B:
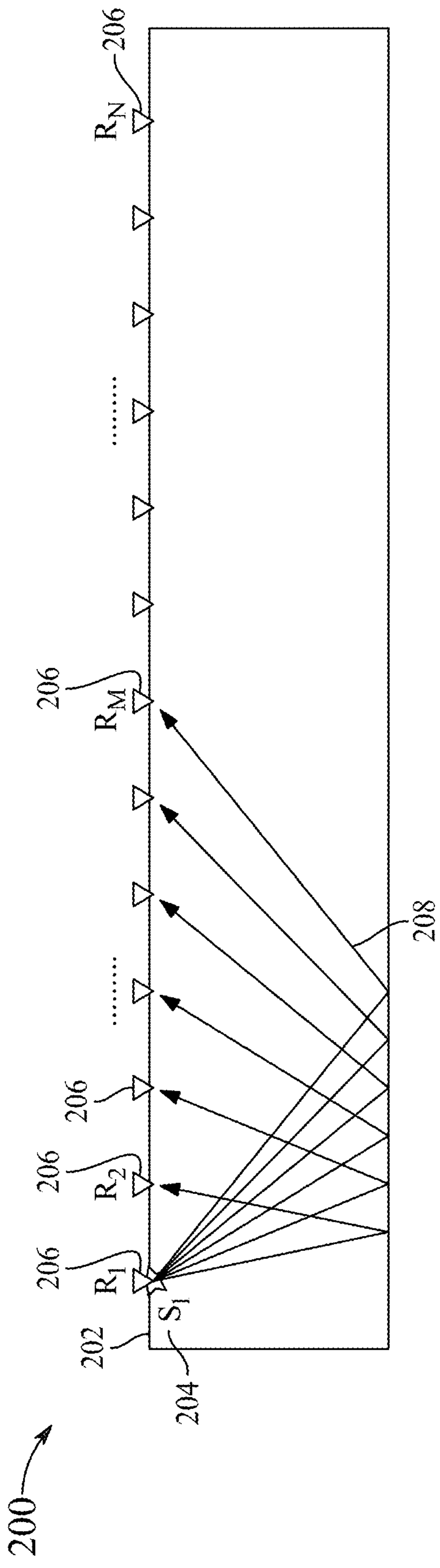
FIG. 2B illustrates a seismic energy transmission shots pattern from a seismic source with configuration of a rolling array of seismic wave receivers, according to certain embodiments.

FIG. 2B illustrates a seismic energy transmission shots pattern 200 from a seismic source with configuration of a rolling array of seismic wave receivers 206, according to an aspect of the present disclosure. In this configuration, initially only a subset of receivers, ranging from seismic receivers 206 $R_1$ to seismic receivers 206 $R_M$, are activated during a first shot, and remaining seismic receivers 206 are turned off. The seismic source 204 is initially positioned at a first shot location, for example, near a first seismic receiver 206 represented by R1. A seismic shot (represented by a star near the first seismic receiver 206 R1 that is also representative of the seismic shot 124 in FIG. 1) is fired by the seismic source 204. All activated seismic receivers 206 record secondary seismic signals 128 or a shot gather. Consecutively, the seismic source 204 is moved to a location near a second seismic receiver 206 represented by $R_2$. At this time, seismic receivers 206 $R_2$ to $R_{M+1}$ are activated, and remaining seismic receivers 206, including the first seismic receiver 206 $R_1$, are deactivated. The seismic source 204 again fires the shot and a new shot gather is recorded by all the activated seismic receivers 206. Accordingly, the process of shot firing by the seismic source 204, recording the shot gather by all seismic receivers 206 between $R_1$ and $R_M$ with the remaining seismic receivers being turned OFF, subsequently moving the seismic source 204 to the next seismic receiver 206 $R_1$ and turning ON all seismic wave receivers 206 in between and including $R_1$ and $R_{M+1}$ and again firing a shot is repeated until all the required shot gathers are collected. In this case also, to increase the signal-to-noise ratio (SNR) of the recorded data, each shot is recorded using at least 10 stacks, that is, at least 10 different seismic receiver 206 should receive the shot gather for a single shot fired by the seismic source 204. In both cases, that is in FIG. 2A and FIG. 2B, the surface layer 202 is representative of the surface layer 102 in FIG. 1, the seismic source 204 is representative of the seismic source 104 in FIG. 1, seismic receivers 206 are representative of seismic receivers 106 in FIG. 1 and the shot corresponds to the seismic wave 124 from the seismic source 104 in FIG. 1, respectively.

Referring back to FIG. 1, plurality of seismic receivers 106 thus receive secondary seismic waves 124 refracted from a subsurface formation within the geologic formation 108 after being shot from the seismic source 104. Each seismic receiver 106 converts seismic waves 124 into a plurality of seismic traces. The transmitter 110 in each seismic receiver 106 transmits the seismic traces to be received by the antenna 114 connected to the computing unit 112. In an aspect of the present disclosure, each seismic receiver 106 may store seismic traces in the seismic wave receiver memory 122 and then transmit the seismic traces to the computing unit 112.

The computing unit 112, upon receiving seismic traces from the transmitter 110 of each seismic receiver 106, inputs the received seismic traces to the signal processing circuitry 116. The signal processing circuitry 116 is configured to gather and stack the seismic traces from a plurality of seismic receivers 106. The signal processing circuitry 116 subsequently rearranges seismic traces from the plurality of seismic receivers 106 to form and identify a common midpoint (CMP) gather. To achieve the common midpoint gather, the signal processing circuitry 116 assigns each individual seismic trace to the midpoint located precisely between the position of the seismic source 104 which fired the seismic wave and the one or more positions of the seismic receivers 106 associated with the same trace. As such, the signal processing circuitry 116 analyzes the number of multiple traces that share the same midpoint. Accordingly, whichever traces are identified as forming and sharing the same common midpoint, the signal processing circuitry 116 groups them together to form the common midpoint gather. Now, the signal processing circuitry 116 applies a graph-based model of the subsurface layer over the identified traces in the common midpoint (CMP) gather in order to find the velocities of seismic waves in one or more sublayers. However, a configuration of the seismic source, the seismic receiver, the CMP point along with the nature of wave propagation from the seismic source towards the seismic receiver, are later utilized in the graph-based model of the subsurface layer to calculate the velocity in various subsurface layers. The graph-based model is now described, as an introductory part to act as an aid to understand the concept of graph theory in depth, with respect to FIG. 3.

Figure 3:
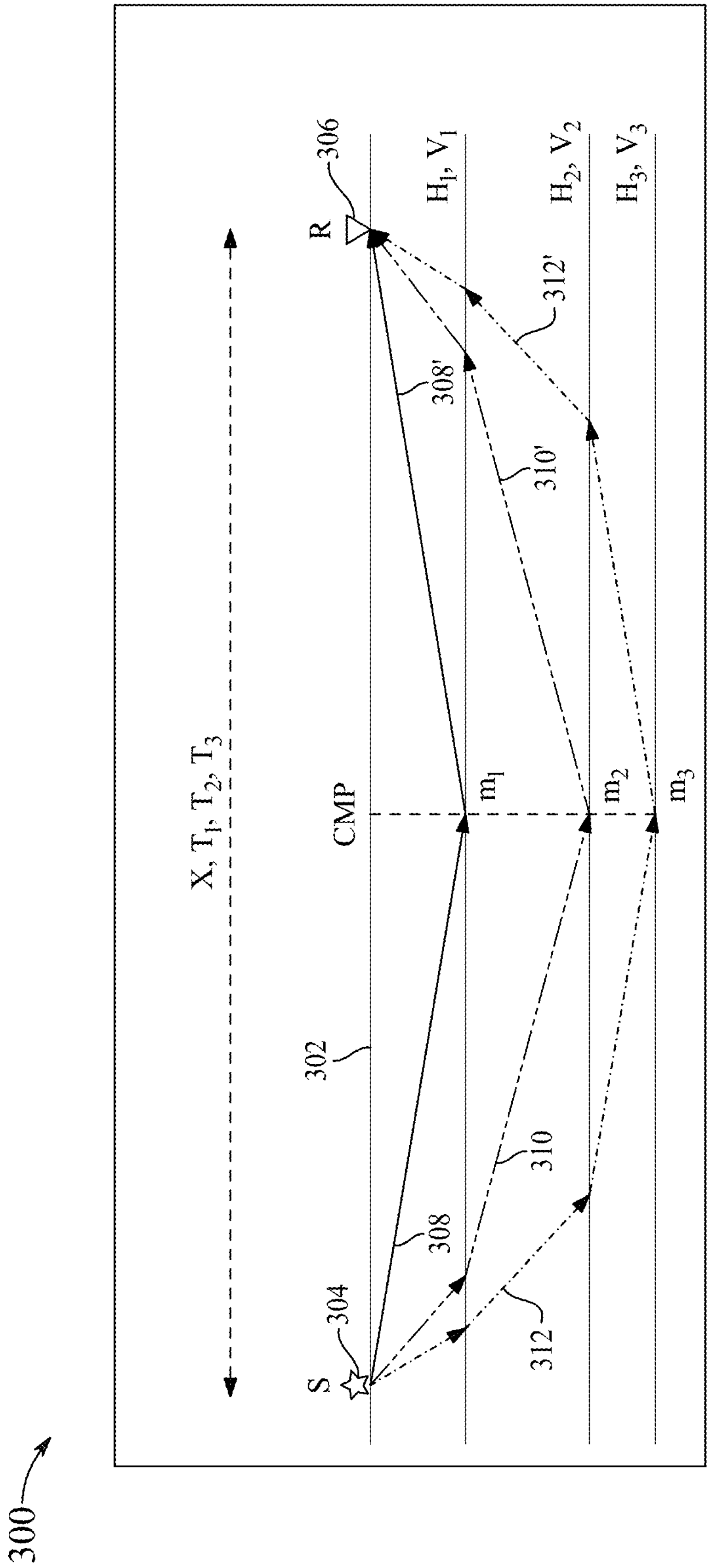
FIG. 3 illustrates a pattern of wave propagation of seismic waves from a source S towards a receiver R through plurality of sublayers, according to certain embodiments.

FIG. 3 illustrates a pattern 300 of wave propagation of seismic waves from a source S 304 towards a receiver R 306 through plurality of sublayers, according to an aspect of the present disclosure. It is well known that the seismic velocity of subsurface layers controls wave propagation across the layer. FIG. 3 shows a 3-layer model of the subsurface layer below a surface layer 302. The source S 304 fires a seismic wave immediately into the surface layer 302 and seismic waves emanate from the shot source S 304 along all directions. A seismic waveform ray 308 that travels with velocity V1 within a first subsurface layer of height H1 from the surface layer 302 gets reflected from the boundary m1 of the first subsurface layer at height H1 and reaches directly to the seismic receiver R 306 as a reflected ray 308'. Some of the seismic waves cross layer boundaries. For example, another wave forms a ray 310 that travels with velocity $V_2$ within a second subsurface layer of height $H_2$ from the surface layer 302 and is refracted from the second subsurface layer. The ray 310 is reflected from the boundary $m_2$ of the second subsurface layer at height $H_2$ and again travels back towards the boundary of the first subsurface layer. At the boundary of the first subsurface layer, the ray 310 is again refracted from the boundary of the first subsurface layer at height $H_1$ and directly reaches the seismic receiver 306 R as a ray 310'. The reflection and refraction process also occurs with the third ray 312 and 312' in between the seismic source S 304 and the seismic receiver R 306 in a third subsurface layer of height $H_3$ and with velocity $V_3$ in the third subsurface layer. $M_1$, $m_2$, and $m_3$ establish a common midpoint (CMP) gather at which each type of wave gets reflected or refracted from the boundary of the interface between two subsurface layers.

At the boundary of each layer, Snell's law must satisfy the following equation:

$$\frac{\sin\theta_1}{V_1} = \frac{\sin\theta_2}{V_2}, \tag{1}$$

where, $\theta_1$=Angle of incident rays relative to the normal to the interface.

$\theta_2$=Angle of transmitted rays relative to the normal to the interface.

Also,

X=Offset or distance between the seismic source 304 S and the seismic receiver 306 R.

$T_i$=Two-way time from the seismic source 304 S to the seismic receiver 306 R where i=1, 2, 3.

It can be shown geometrically that the two-way travel time (T) of a ray reflected from any interface is related to the time offset (X) between the seismic source 304 S and the seismic receiver 306 R on the surface layer 302 through the following hyperbolic relation:

$$T^2(X) = T_0^2 + \frac{X^2}{V^2}, \tag{2}$$

where $T_0$=2H/V is the zero-offset two-way time and H and V are the depth and velocity, respectively, from the surface 306 layer to the interface.

The topmost layer is generally accessible for direct velocity measurement and satisfies the hyperbolic assumption of equation (2). However, deeper layers generally do not satisfy equation (2) due to ray bending. Advantageously, based upon this wave pattern between the source S 304 and the receiver R 306, a physical system can be equally represented in the form of graphs. As such, the properties of the underlying model may be analyzed by using a graph theory, such as the properties and structure of the graph from its spectrum. Some fundamentals related to graph theory are now discussed with respect to FIGS. 4A and 4B. The aforementioned fundamentals are used as a tool during the computation of velocities in different subsurface layers using a graph-based model of the physical system, including the seismic source 104, the plurality of seismic receivers 106, and the nature of wave propagation from the seismic source 104 towards the plurality of seismic receivers 106.

Figure 4A:
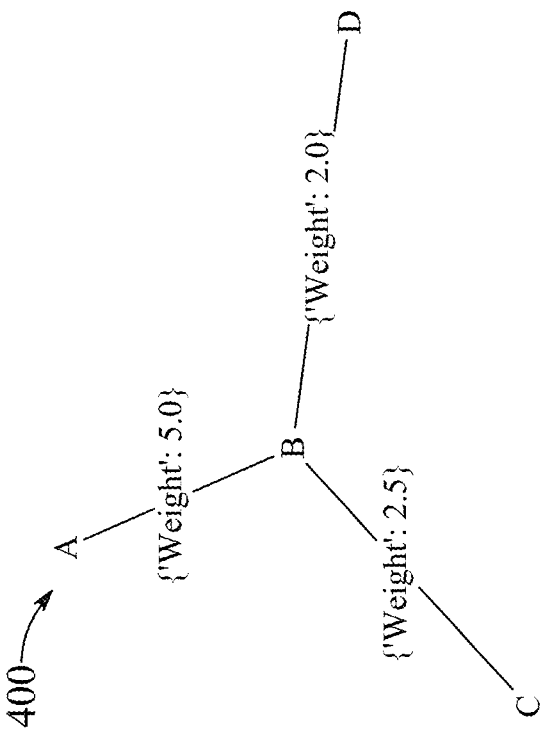
FIG. 4A illustrates an exemplary graph G with three edges, according to certain embodiments.

FIG. 4A illustrates an exemplary graph G 400 with three edges, according to an aspect of the present disclosure. The graph 400A includes four vertices named A, B, C and D. The edges can be represented as AB, CB and DB, respectively. Vertices A and B are neighbors since they have an edge AB between them. Similarly, B, C and D are all neighbors, since there is the edge CB and DB connecting each pair, respectively. Edges AB, CB, and DB are assigned weights 5, 2.5, 2.0 units, respectively, in this example. In an aspect, the assigned weight on the edge may represent a distance between two vertices connected by the same edge. For example, weight 5 on the edge AB may represent a distance of 5 units between the vertices A and B. Similarly follows for other weights and edges. The graph 400A could be represented in matrix form as an adjacency matrix A(G), given by:

$$A(G) = \begin{pmatrix} E11 & E12 & E13 & E14 \\ E21 & E22 & E23 & E24 \\ E31 & E32 & E33 & E34 \\ E41 & E42 & E43 & E44 \end{pmatrix}. \tag{3}$$

-continued $$\text{where } E_{ij} = \begin{cases} 1, & \text{if } v_i \sim v_j, \\ 0, & \text{otherwise,} \end{cases}$$

Therefore, $$A(G) = \begin{pmatrix} 0 & 1 & 0 & 0 \\ 1 & 0 & 1 & 1 \\ 0 & 1 & 0 & 0 \\ 0 & 1 & 0 & 0 \end{pmatrix}.$$

Accordingly, the adjacency matric A(G) of a graph 400A having n vertices (4, for example) will have n×n elements in its adjacency matrix (that is 4×4=16 elements). Furthermore, the graph 400A could again be represented in matrix form as a weighted adjacency matrix W(G), given by:

$$W(G) = \begin{pmatrix} W11 & W12 & W13 & W14 \\ W21 & W22 & W23 & W24 \\ W31 & W32 & W33 & W34 \\ W41 & W42 & W43 & W44 \end{pmatrix}, \tag{4}$$

$$\text{where, } w_{ij} = \begin{cases} w(i, j), & \text{if } v_i \sim v_j \\ 0, & \text{otherwise,} \end{cases}$$

Therefore, $$W(G) = \begin{pmatrix} 0 & 5 & 2.5 & 2 \\ 5 & 0 & 0 & 0 \\ 2.5 & 0 & 0 & 0 \\ 2 & 0 & 0 & 0 \end{pmatrix}$$

Similarly, the weighted adjacency matrix W(G) of a graph 400A having n vertices (4 in this example) will also have n×n elements into its adjacency matrix (that is 4×4=16 elements). In analyzing the pattern 300 of wave propagation of seismic waves from a source S 304 towards a receiver R 306 through plurality of sublayers shown in FIG. 3, a weighted adjacency matrix may represent the paths of the seismic waves from the seismic source 304 to the seismic receiver 306 represented by 308 and 308', 310 and 310', and 312 and 312', wherein the weight assigned to each ray is represented by the distance covered by the ray.

Figure 4B:
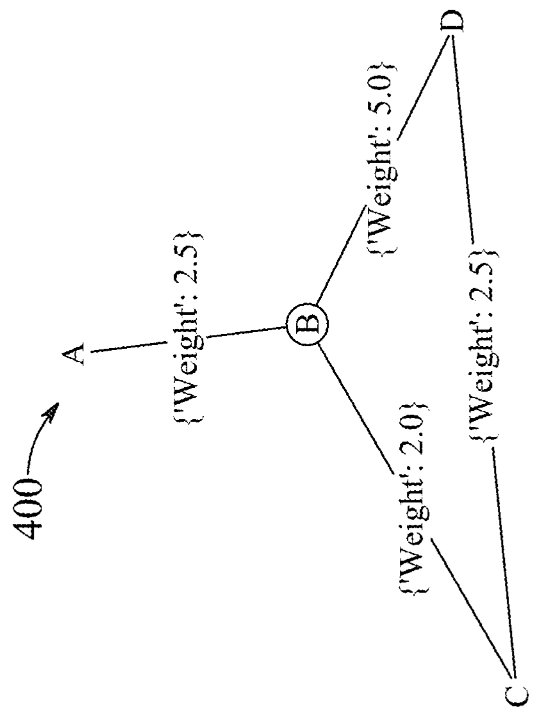
FIG. 4B illustrates an exemplary graph G with four edges, according to an embodiment.

FIG. 4B illustrates an exemplary graph G with four edges, according to an aspect of the present disclosure. The graph G in 400B also includes four vertices called A, B, C and D. The edges can be represented as AB, CB, DB and CD, respectively. Vertices A and B are neighbors since they have the edge AB between them. Similarly, B, C and D are all neighbors, since there is the edge CB and CD connecting each pair, respectively. Here, vertices C and D are also neighbors since there is the edge CD in between vertices C and D. Edges AB, CB, DB and CD could be assigned weights 2.5, 2, 5 and 2.5 units, respectively. Here again, the weights between the vertices could represent a distance between pair of vertices connected by the same edge. The adjacency matrix A(G) as well as the weighted adjacency matrix W(G) could again be written as below:

Adjacency Matrix A(G):

$$A(G)=\begin{pmatrix}0&1&0&0\\1&0&1&1\\0&1&0&1\\0&1&1&0\end{pmatrix}$$

Weighted Adjacency Matrix W(G):

$$W(G)=\begin{pmatrix}0&2.5&0&0\\2.5&0&2.0&5.0\\0&2.0&0&2.5\\0&5.0&2.5&0\end{pmatrix}.$$

Considering, FIGS. 4A and 4B together, the degree of each vertex '$V_i$' is defined as below:

$$d_{vi}=\sum\nolimits_{j=1}^{n}a_{ij}. \tag{5}$$

Also, when considering the weights, the degree of each vertex '$V_i$' is defined as below:

$$d_{vi}^{w}=\sum\nolimits_{j=1}^{n}w_{ij}. \tag{6}$$

For a given matrix G, dv, and $$d_{vi}^{w}$$

are sums of rows i in matrices A(G) and W(G), respectively.

The degree matrix D(G) without weight can be given as:

$$d_{ij}=\begin{cases}d_{vi}, & \text{if } i=j,\\ 0, & \text{otherwise,}\end{cases}. \tag{7}$$

And the degree matrix $D_w(G)$ with weight can be expressed as:

$$d_{ij}=\begin{cases}d_{vi}^{w}, & \text{if } i=j,\\ 0, & \text{otherwise,}\end{cases} \tag{8}$$

When weights (that is weight on edge) are not considered, the Laplacian matrix $\mathcal{L}$ can be provided as below:

$$\mathcal{L}=D-A. \tag{9}$$

When weights are considered, the Laplacian matrix $\mathcal{L}^w$ can be provided as below:

$$\mathcal{L}^w=D_w-W. \tag{10}$$

Further, the symmetrically normalized Laplacian for a non-weighted case can be provided as below:

$$L_{sym}(G)=(D^{-1})^{\frac{1}{2}}\mathcal{L}(D^{-1})^{\frac{1}{2}}. \tag{11}$$

Also, the symmetrically normalized Laplacian for a weighted case can be provided as below:

$$L_{sym}^{w}(G)=(D_w^{-1})^{\frac{1}{2}}\mathcal{L}^w(D_w^{-1})^{\frac{1}{2}}. \tag{12}$$

Also, for connected graphs, every vertex has a strictly positive degree. Therefore, $D=D_w$=diagonal matrices with positive diagonals. (13)

Also, $$d_{ij}=\begin{cases}\frac{1}{\sqrt{d_{vi}}}, & \text{if } i=j,\\ 0, & \text{otherwise,}\end{cases} \tag{14}$$

$$\text{and } d_{ij}=\begin{cases}\frac{1}{\sqrt{d_{vi}^{w}}}, & \text{if } i=j,\\ 0, & \text{otherwise,}\end{cases} \tag{15}$$

Simplifying the above equations, the normalized Laplacians $\mathcal{L}$ without (dimensionless quantity) weight can be given as below:

$$L_{sym}(G)=(D^{-1})^{\frac{1}{2}}(D-A)(D^{-1})^{\frac{1}{2}}=I-(D^{-1})^{\frac{1}{2}}A(D^{-1})^{\frac{1}{2}} \tag{16}$$

Also, the normalized Laplacians $\mathcal{L}$ with weight (dimensionless quantity) can be given as below:

$$L_{sym}^{w}(G)=(D_w^{-1})^{\frac{1}{2}}(D_w-W)(D_w^{-1})^{\frac{1}{2}}=I-(D_w^{-1})^{\frac{1}{2}}W(D_w^{-1})^{\frac{1}{2}}. \tag{17}$$

Here, $$I=\text{Identity matrix} \tag{18}$$

Also, eigenvalues of the normalized Laplacians $\mathcal{L}$ (dimensionless quantity) without weight can be given as, $$|L_{sym}(G)-\lambda I|=0. \tag{19}$$

The solution of equation (19) provides one or more of eigenvalues (λ) for which satisfy the equation. Moreover, the eigenvalue of the normalized Laplacians $\mathcal{L}$ is a dimensionless quantity.

Also, eigenvalues of normalized Laplacians $\mathcal{L}$ (dimensionless quantity) with weight can be given as, $$|L_{sym}^{w}(G)-\lambda I|=0. \tag{20}$$

The solution of equation (20) provides one or more eigenvalues (λ) which satisfy equation (20). Moreover, the eigenvalue of the weighted normalized Laplacians $\mathcal{L}$ is a dimensionless quantity.

Furthermore, for a graph G with distinct eigenvalues $\lambda_i$, i=1, 2, . . . , k, each with multiplicity $m_i$, the spectrum can be given as below:

$$\begin{pmatrix} \lambda_1 & \lambda_2 & \ldots & \lambda_k \\ m_1 & m_2 & \ldots & m_k \end{pmatrix} \tag{21}$$

For example, if the Eigenvalues of $L_{sym}(G)$ are [1.6287, 1.5,0.7713,0] and the eigenvalues of $$L_{sym}^{w}(G)$$

are [1.7839,1.3798,0.8363,0], the spectra of $L_{sym}(G)$ are provided as below:

$$\begin{pmatrix} 1.6287 & 1.5 & 0.7713 & 0 \\ 1 & 1 & 1 & 1 \end{pmatrix},$$

and the spectra of $$L_{sym}^{w}(G)$$

are expressed as below:

$$\begin{pmatrix} 1.7839 & 1.3798 & 0.8363 & 0 \\ 1 & 1 & 1 & 1 \end{pmatrix}.$$

Referring back to FIG. 1 and including the plurality of concepts and equations used in the graph theory as illustrated in FIGS. 4A and 4B, along with the exemplary illustration of the wave propagation between the seismic source and the seismic receiver as provided in FIG. 3, the signal processing circuitry 116 applies a graph-based model of the subsurface layer over the identified traces in the common midpoint (CMP) gather in order to find velocities of the seismic waves in one or more sublayers. In order to identify the velocities of the seismic waves in one or more of the sublayers, the signal processing circuitry 116 initially gathers and stacks the seismic traces. The signal processing circuitry 116 then determines a common midpoint of the stack of the seismic traces and creates plot lines of the identified traces in the common midpoint (CMP) gather which includes only those traces which were identified as sharing the same common midpoint (CMP). The details of the plot lines of traces are provided in FIG. 5

Figure 5A:
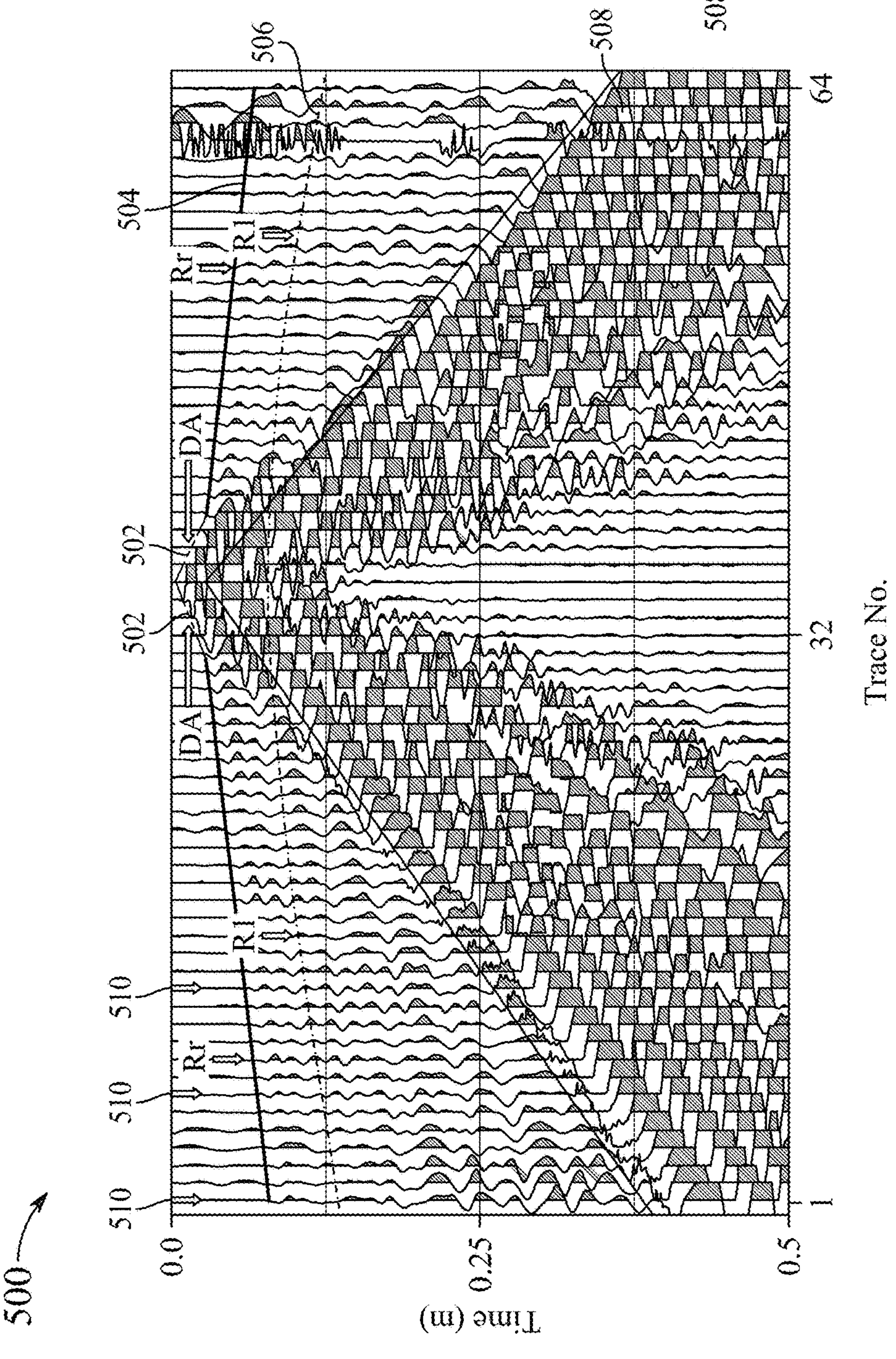
FIG. 5A illustrates a plot of common mid-point (CMP) gathers due to multiple traces, according to certain embodiments.
Figure 5B:
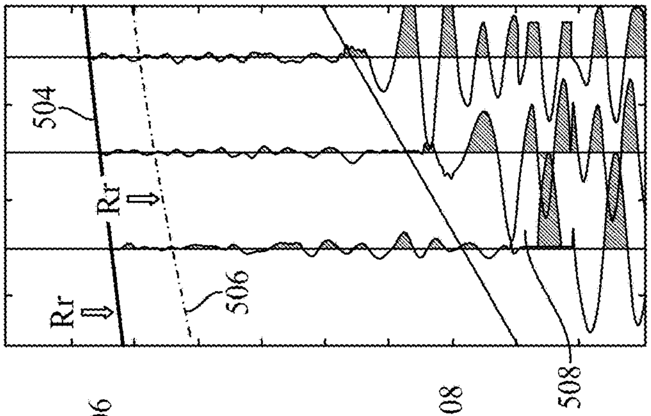
FIG. 5B illustrates chosen traces from common mid-point (CMP) gathers, according to certain embodiments.

FIG. 5A illustrates the plot lines 500 of common midpoint (CMP) gathers due to multiple traces. FIG. 5A is described in conjugation with FIG. 1. The x axis represents the number of traces detected by the seismic receiver 106. The y axis represents the time duration between the instant when the seismic source 104 fires the seismic wave 124 in the surface layer 102 and the instant when the seismic receivers 106 receive the secondary seismic wave 124. The plot lines 500 show direct arrival waves 502, reflected waves 504, refracted waves 506 and surface waves 508. The signal processing circuitry 116 uses the plot lines pattern of direct arrival waves 502 of seismic traces and calculates the inverse of the slope of the direct arrival waves 502. Computation of the inverse of the slope of the direct arrival waves 502 gives a velocity of seismic waves of a first subsurface layer of the geologic formation. The first subsurface layer indicates the layer of the geological formation immediately below the earth surface layer 102.

The signal processing circuitry 116 randomly selects at least three traces in the common midpoint (CMP). For example, the signal processing circuitry 116 selects traces 1, 13 and 17, as shown by traces 510 (shown in FIGS. 5A, 5B). Further, the signal processing circuitry 116 builds a graph-theory based seismic model of a ray path between the seismic source 104 and the seismic receiver 106 and a geometry of the seismic source 104 to the seismic receiver 106 using the fundamentals of wave propagation and the graph theory as discussed in FIG. 3 and FIG. 6. Once the seismic model is developed, the signal processing circuitry 116 is configured to fit the data points of the selected traces 1, 13 and 17 in a graph-theory-based seismic model to calculate the possible velocity of the subsurface layer. The layout of the graph theory-based seismic model is described in FIG. 6.

Figure 6:
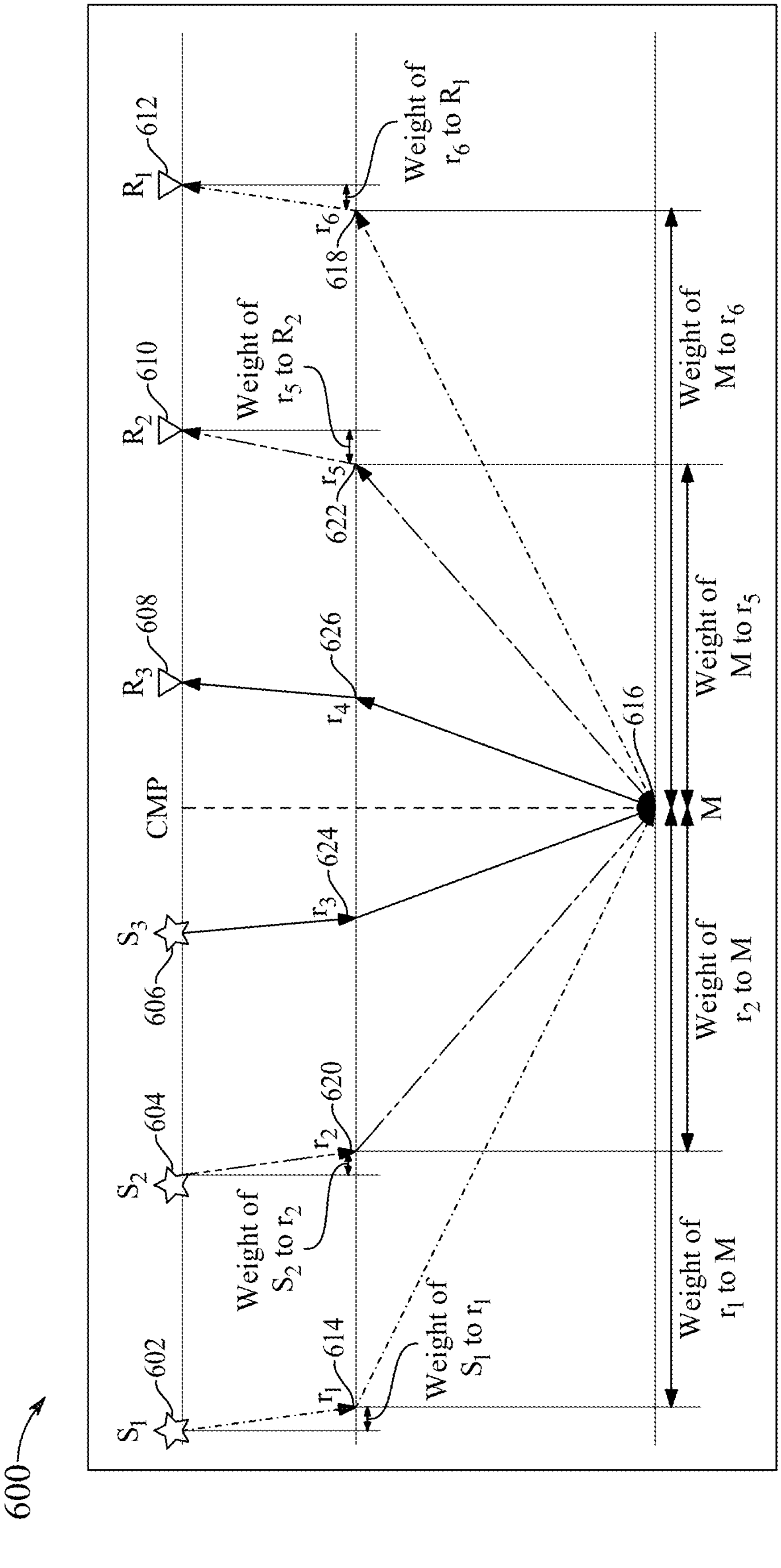
FIG. 6 illustrates a layout of a graph-theory based seismic model, according to certain embodiments.

FIG. 6 illustrates a generated layout of a graph theory-based seismic model 600. To depict the graph-theory-based seismic model on a graph, the signal processing circuitry 116 generates three pairs of seismic source 104 to seismic receiver 106 combinations from the CMP data. The three pairs of source and receiver combination may be a first seismic source $S_1$ 602 pair with a first seismic wave receiver $R_1$ 612, a second seismic source $S_2$ 604 pair with a second receiver $R_2$ 610, and a third seismic source $S_3$ 606 pair with a third seismic wave receiver $R_3$ 608. As such, the seismic source/seismic wave receiver geometries represent ray paths of a seismic signal by one of the seismic source (generally referred to as S) as it travels through the first subsurface layer, refracts into a second subsurface layer, reflects from a third subsurface layer, refracts out of the second subsurface layer and is received by one of the seismic wave receivers (generally referred to as R). Further, the signal processing circuitry 116 defines the source and receiver points, $S_1$ to $S_3$ and $R_1$ to $R_3$, subsurface layer interface transmission points $r_1$ 614, $r_2$ 620, $r_3$ 624, $r_4$ 626, $r_5$ 622 and $r_6$ 618. The signal processing circuitry 116 further defines a mid-point M 616 as the CMP point. All defined points such as $S_1$, $R_1$, $S_2$, $R_2$, $S_3$, $R_3$, $r_1$, $r_2$, $r_3$, $r_4$, $r_5$, $r_6$ and the mid-point M 616 are represented as vertices of the graph-theory based layout.

The signal processing circuitry 116 further defines the ray path in between the pairs of seismic source S to seismic receivers R through transmission points $r_1$, $r_2$, $r_3$, $r_4$, $r_5$ and $r_6$ and the mid-point M 616. As such, the signal processing circuitry 116 defines a first ray path as extending from a vertex at the seismic source $S_1$ 402 to a vertex at a first refraction point as the transmission point $r_1$ 614 on the second subsurface layer. The signal processing circuitry 116 further defines a second ray path as extending from the vertex at the first refraction point at the transmission point $r_1$ 614 on the second subsurface layer to a vertex at the reflection point of the third subsurface layer which is the mid-point M 616. The signal processing circuitry 116 further defines a third ray path as extending from the vertex at the reflection point which is the mid-point M 616 of the third subsurface layer to a vertex $r_6$ 618 at a second refraction point on the second subsurface layer. The signal processing circuitry 116 further defines a fourth ray path as extending from the vertex at $r_6$ 618 at the second refraction point at the second subsurface layer to the first seismic wave receiver $R_1$ 612. The signal processing circuitry 116 further defines a fifth ray path as the distance parallel to the surface layer from the location of the seismic source $S_1$ to the location of the first seismic wave receivers $R_1$ 612.

Similarly, the signal processing circuitry 116 further defines a sixth ray path as extending from a vertex at the seismic source $S_2$ 604 to a vertex at a first refraction point as the transmission point $r_2$ 620 on the second subsurface layer. The signal processing circuitry 116 further defines a seventh ray path as extending from the vertex at the first refraction point that is at the transmission point $r_2$ 620 on the second subsurface layer to a vertex at the reflection point of the third subsurface layer that is the mid-point M 616. The signal processing circuitry 116 further defines an eighth ray path as extending from the vertex at the reflection point that is the mid-point M 616 of the third subsurface layer to a vertex $r_5$ 622 at a second refraction point on the second subsurface layer. The signal processing circuitry 116 further defines a ninth ray path as extending from the vertex at $r_5$ 622 at the second refraction point at the second subsurface layer to the seismic wave receiver $R_2$ 610. The signal processing circuitry 116 further defines a tenth ray path as the distance parallel to the surface layer from the location of the seismic source $S_2$ to the location of the seismic wave receivers $R_2$ 610.

Similarly, the signal processing circuitry 116 further defines an eleventh ray path as extending from a vertex at the third seismic source $S_3$ 606 to a vertex at a first refraction point as the transmission point $r_3$ 624 on the second subsurface layer. The signal processing circuitry 116 further defines a twelfth ray path as extending from the vertex at the first refraction point that is at the transmission point $r_3$ 624 on the second subsurface layer to a vertex at the reflection point of the third subsurface layer, that is the mid-point M 616. The signal processing circuitry 116 further defines a thirteenth ray path as extending from the vertex at the reflection point, that is, the mid-point M 616 of the third subsurface layer, to a vertex $r_4$ 626 at a second refraction point on the second subsurface layer. The signal processing circuitry 116 further defines a fourteenth ray path as extending from the vertex at $r_4$ 626 at the second refraction point at the second subsurface layer to the third seismic wave receiver $R_3$ 608. The signal processing circuitry 116 further defines a fifteenth ray path as the distance parallel to the surface layer from the location of the seismic source $S_3$ to the location of the third seismic wave receivers $R_3$ 608.

The signal processing circuitry 116 further defines ray paths $S_1$ 602 to $r_1$ 614, $r_1$ 614 to M 616, M 616 to $r_6$ 618, $r_6$ 618 to $R_1$ 612 and $S_1$ 602 to $R_1$ 612 as edges of the graph. The signal processing circuitry 116 further defines ray paths $S_2$ 604 to $r_2$ 620, $r_2$ 620 to M 616, M 616 to $r_5$ 622, $r_5$ 622 to $R_2$ 610 and $S_2$ 604 to $R_2$ 610 as edges of the graph. The signal processing circuitry 116 further defines ray paths $S_3$ 606 to $r_3$ 624, $r_3$ 624-M 616, M 616-$r_4$ 626, $r_4$ 626-$R_3$ 608 and $S_3$ 606-$R_3$ 608 also as edges of the graph. According to the generated layout of the graph theory-based seismic model 600, the vertices $S_1$ 602, $S_2$ 604, $S_3$ 606, $R_1$ 622, $R_2$ 610, $R_3$ 608 and M 616 are fixed in their positions, while the location of vertices $r_1$ 614, $r_2$ 620, $r_3$ 624, $r_4$ 626, $r_5$ 622 and $r_6$ 618 depend on the velocities and thicknesses values ($V_1$, $V_2$, $H_1$, and $H_2$). $V_1$ indicates the velocity of the first subsurface layer, $H_1$ indicates height of the first subsurface layer, $V_2$ indicates the velocity of the second subsurface layer and $H_2$ indicates the height of the second subsurface layer from the surface layer. The velocity value of the seismic wave within the first subsurface layer of the geologic formation has previously been calculated by the signal processing circuitry 116 using the inverse of the slope of the direct ray.

Next, the signal processing circuitry 116 uses the mathematics of the graph theory and associated numerical equations in the graph theory to solve for the velocity value of the second subsurface layer. Before computing the velocity value of the second subsurface layer, the signal processing circuitry 116 needs to calculate the values of the weights on each edge. As such, the signal processing circuitry 116 measures a distance parallel to the surface layer from the location of the seismic source $S_1$ 602 to a projection of the first refraction point $r_1$ 614 on the surface layer. The measured distance defines a weight of the first ray path $S_1$ 602-$r_1$ 614. Alternatively, the signal processing circuitry 116 may measure a distance parallel to the first subsurface layer from the location of the first refraction point $r_1$ 614 to a projection of the seismic source $S_1$ 602 on the first subsurface. The measured distance defines a weight of the first ray path $S_1$ 602 to $r_1$ 614. The signal processing circuitry 116 further determines a weight of the edge $r_1$ 614 to M 616 by measuring a distance parallel to the surface layer from the projection of the refraction point $r_1$ 614 on the surface layer to the common midpoint 616 M. The measured distance defines a weight of the second ray path $r_2$ 620 to M 616. The signal processing circuitry 116 further determines a weight of the edge $r_1$ 614-M 616 by measuring a distance parallel to the surface layer from the projection of the refraction point $r_1$ 614 on the surface layer to the common midpoint 616 M. The measured distance defines a weight of the second ray path $r_2$ 620 to M 616. The signal processing circuitry 116 further determines a weight of the edge M 616 to $r_6$ 618 by measuring a distance parallel to the surface layer from the common midpoint M 616 to a projection of the second refraction point $r_6$ 618 on the surface layer. The measured distance defines a weight of the third ray path M 616 to $r_6$ 618. The signal processing circuitry 116 further determines a weight of the edge $r_6$ 618 to $R_1$ 612 by measuring a distance parallel to the surface layer from the projection of the second refraction point $r_6$ 618 on the surface layer to the first seismic wave receiver $R_1$ 612. The measured distance defines a weight of the fourth ray path $r_6$ 618 to $R_1$ 612. In a repetitive and similar manner, the signal processing circuitry 116 is further configured to measure weights of the remaining edges, such as the fifth ray path, the sixth ray path, the seventh ray path, the eighth ray path, the ninth ray path, the tenth ray path, the eleventh ray path, the twelfth ray path, the thirteenth ray path, the fourteenth ray path and the fifteenth ray path. The weight of each ray path represents a distance travelled by the seismic wave as it travels through the first subsurface layer and the second subsurface layer of the geologic formation 108 from the seismic source 104 to one of the plurality of seismic wave receivers 106.

Upon measuring the weights of all edges, the signal processing circuitry 116 arranges the weights of all the edges in weight matrix form using equation (4) as discussed in FIG. 3 and also provided as below:

$$w_{ij} = \begin{cases} w(i, j), & \text{if } v_i \sim v_j \\ 0, & \text{otherwise,} \end{cases} \tag{4}$$

As such, if the two vertices are connected, then the weight of that edge connecting the two vertices is multiplied with 1 and used in the matrix, otherwise a zero is used in the matrix. For the three selected traces, the signal processing circuitry 116 identifies the ray path and source-receiver geometry which define a total of 21 possible locations of the transmission points ($r_1$ to $r_6$). As such the signal processing circuitry 116 is configured to generate 21 different adjacency matrices by using equation (3) as discussed earlier as well as given below:

$$E_{ij} = \begin{cases} 1, & \text{if } v_i \sim v_j, \\ 0, & \text{otherwise,} \end{cases} \quad (3)$$

Using equation 4, the signal processing circuitry 116 is configured to form a weighted adjacency matrix W from the combinations of total 21 transmission points. In a similar way, the signal processing circuitry 116 forms another 20 different weighted adjacency matrix W using equation (4) above. As such, the signal processing circuitry 116 forms total 21 different weighted adjacency matrix W using equation (4).

Once the signal processing circuitry 116 has completed forming the 21 different weighted adjacency matrix W using equation (4), the signal processing circuitry 116 further uses equation (8) below to form a weighted degree matrix $D^{-1}$ from the combinations of the total 21 different transmission points, wherein:

$$d_{ij} = \begin{cases} d^w_{v_j}, & \text{if } i = j, \\ 0, & \text{otherwise,} \end{cases} \quad (8)$$

Once the signal processing circuitry 116 has completed forming a weighted degree matrix $D^{-1}$ using equation (8), the signal processing circuitry 116 further calculates an inverse $(D^{-1})^{1/2}$ of the weighted degree matrix $D^{-1}$.

Once the signal processing circuitry 116 has completed calculating the inverse $(D^{-1})^{1/2}$ of the weighted degree matrix, the signal processing circuitry 116 further uses equation (16) to form a normalized weighted Laplacian matrix $$L^w_{sym},$$

given by:

$$L_{sym}(G) = (D^{-1})^{\frac{1}{2}}(D-A)(D^{-1})^{\frac{1}{2}} = I - (D^{-1})^{\frac{1}{2}}A(D^{-1})^{\frac{1}{2}} \quad (16)$$

where I is the identity matrix as described earlier in FIG. 3.

Further, the signal processing circuitry 116 uses equation (17) to calculate eigenvalues of the normalized weighted Laplacian matrix. Equation (17) is provided as below:

$$|L_{sym}(G) - \lambda I| = 0 \quad (17)$$

The solution of equation (17) provides one or more of eigenvalues (λ) which satisfy the relationship of equation 17. Also, for each adjacency matrix, more than one eigenvalue is generated. Accordingly, for the 21 different adjacency matrix, a plurality of eigenvalues are generated.

One or more eigenvalues (λ) may be compared with each other to identify the second largest eigenvalues (λ) out of the total number of calculated eigenvalues (λ). As such, the signal processing circuitry 116 determines which eigenvalue has the second largest absolute value of the eigenvalues by comparing all the calculated eigenvalues with each other in each case of the adjacency matrix. Once the second largest eigenvalue is identified, the signal processing circuitry 116 selects the second largest eigenvalue (λ) and forms a quartic regression polynomial $\hat{V}_2$ of the eigenvalue having the second largest absolute value for a single case of the adjacency matrix. Similarly, the signal processing circuitry 116 repeats comparing the eigenvalues with one another and finding the second largest absolute value for the remaining 20 adjacency matrix.

The quartic regression polynomial is given by:

$$\hat{V}_2 = \sum_{i=0}^{4} \beta_i x^i. \quad (18)$$

In the quartic regression polynomial $\hat{V}_2$, the calculated second largest eigenvalue (λ) is represented by a term 'x'.

Expanding equation 18, the absolute value of the velocity in second sublayer is given by:

$$\hat{V}_2 = \beta_0 + \beta_1 x + \beta_2 x^2 + \beta_3 x^3 + \beta_4 x^4, \quad (19)$$

where, x is the eigenvalue having the second largest absolute value, and $\beta_0$, $\beta_1$, $\beta_2$, $\beta_3$ and $\beta_4$ are the coefficients of the quartic regression polynomial of $\hat{V}_2$.

The solution of equation 19 yields the velocity of the seismic waves in a second layer of the geologic formation for the single adjacency matrix. However, in order to solve the equation 18, the coefficients of the quartic regression polynomial $\beta_0$, $\beta_1$, $\beta_2$, $\beta_3$ and $\beta_4$ must first be determined.

In order to calculate the coefficients of the quartic regression polynomial $\beta_0$, $\beta_1$, $\beta_2$, $\beta_3$ and $\beta_4$, a small-scale synthetic data technique is used in the graph theory-based seismic model 600. Before calculating the velocity of the second sublayer, coefficients of the quartic regression polynomial $\beta_0$, $\beta_1$, $\beta_2$, $\beta_3$ and $\beta_4$ are learned by developing a similar synthetic model of the physical model similar to the graph theory-based seismic model 600 developed in FIG. 6 and identifying a relationship between the velocity of the second sublayer and the eigenvalues.

To generate the small-scale synthetic model similar to the graph theory-based seismic model 600, to learn the values of quartic regression polynomial $\beta_0$, $\beta_1$, $\beta_2$, $\beta_3$ and $\beta_4$, and to identify the relationship between the velocity of the second sublayer and the eigenvalues, synthetic data is generated. The synthetic data is generated by considering a 3-layer velocity model. Velocity values in the 3-layer velocity model are selected as 500 m/s, 1500 m/s, and 2200 m/s, for the first, second, and the third layer, respectively. The thickness value of the first two layers are selected as 30 m and the thickness of the third layer is selected as 50 m. Three shot gathers located at offsets 0 m, 100 m and 200 m along the ground surface are recorded. A common midpoint (CMP) was generated. The locations of the vertices of the seismic sources $S_1$ to $S_3$, the locations of the vertices of the seismic receivers $R_1$ to $R_3$, and the location of the vertices of the common midpoint M are fixed in their position while the locations of the vertices of the transmission points $r_1$ to $r_6$ depend upon the chosen velocity value and the thickness values in the first, second and the third sublayers, respectively. The velocity value of the first layer ($V_1$) is directly calculated from the inverse of the slope of the direct waves which was found to be approximately same as the chosen value 500 m/s.

In order to calculate the velocity value of the seismic wave in the second sublayer in the synthetic model, thirteen points in the synthetic model were used. Those thirteen points include three seismic sources ($S_1$-$S_3$), three seismic receivers (R1-$R_3$), 6 transmission points ($r_1$-$r_6$) and one mid-point CMP M. At this time the adjacency matrix includes 13×13 elements. The signal processing circuitry 116 calculates the necessary offsets (that is distances between the vertices, also known as weight of the edge) between the beginning and the projection of the end of each edge in order to form this adjacency matrix. Calculation of the offsets is as same as calculating the offsets during development of the graph theory-based seismic model 600 by the signal processing circuitry 116 and is therefore not repeated herein again.

To solve the graph theory based upon the fixed locations of the seismic sources $S_1$-$S_3$, the seismic receivers $R_1$-$R_3$ and the mid-point CMP, the locations of transmission points $r_1$-$r_6$ are unknown and must be calculated As such, the signal processing circuitry 116 considers all possible locations of the transmission points $r_1$ to $r_6$ taking into consideration the geometry of seismic sources $S_1$ to $S_3$, and seismic receiver $R_1$ to $R_3$ in which:

(1) The offset values of $r_1$, $r_2$, and $r_3$ must be less than that of the common point CMP M.

(2) The offset values of $r_4$, $r_5$, and $r_6$ must be greater than that of the common point M.

(3) Transmission points $r_1$ to $r_6$ are arranged in ascending order.

The signal processing circuitry 116 uses a regression model to determine a set of values of velocity for the second sublayer ($V_2$) by calculating the spectral data for each possible location of the transmission points ($r_1$ to $r_6$) in order to calculate the corresponding velocities for the second sublayer ($V_2$). Once the plurality of velocity values have been calculated, the signal processing circuitry 116 is configured to calculate an RMS error for each velocity value. The optimum $V_2$ value is the one that has the minimum RMS error between the calculated and the assumed travel times of all three seismic source (S) to seismic receiver (R) pairs. In the example, the travel time corresponding to 1500 m/s could be calculated as an ideal travel time at height 30 m as assumed for the second layer.

The regression model uses the quartic regression polynomial in this form as given below in equation 20 to derive a relationship between the velocity value in the second sublayer ($V_2$) and the second eigenvalues.

$$V_2 = \sum_{i=1}^{4} \beta_i x^i \tag{20}$$

Next, the signal processing circuitry 116 calculates all of the eigenvalues corresponding to the 13×13 adjacency matrix, selects only the second highest eigenvalues and calculates the value of velocity for each of the selected second highest eigenvalues.

In the next step, the signal processing circuitry 116 selects the ideal velocity value of the second layer $V_2$ (as assumed as 1500 m/s), compares it with the regression polynomial for each calculated value of the second eigenvalues in equation 20, and identifies the corresponding values of each coefficients of regression polynomial $\beta_0$, $\beta_1$, $\beta_2$, $\beta_3$ and $\beta_4$. Once the value of $\beta_i$ are identified, the regression model of the signal processing circuitry 116 learns each of the coe icients $\beta_i$ from the data between the relationships of velocity and the second eigenvalues. The coefficients $\beta_i$ (or learning parameters) are learned using regression tools. In a non-limiting example, the regression tools are accessed from the scikit-learn module of python.

The regression tool splits the data into training and testing data. Consequently, the regression model uses equation (20) to estimate the seismic velocity as a linear combination of one or more velocities. The regression tool splits the data of the velocity ($V_2$) and the second highest eigenvalue (x) into a training data and a test data. The regression tool uses 70% of this data to train the quartic regression model and 30% for testing the quartic regression model. As such, the values of the coefficients of the regression polynomial ($\beta_i$) are learned as below:

$$\beta_0 = 901733.1697351$$

$$\beta_1 = -2313161.30496803$$

$$\beta_2 = 2239771.14791595$$

$$\beta_3 = -968451.33197468$$

$$\beta_4 = 157595.56622496$$

The regression model thus learns the value of the parameter or thus the coefficients of regression polynomial ($\beta_i$) in order to find the value of the velocity in the second subsurface layer. Accordingly, the signal processing circuitry 116 calculates and learns the value of coefficients of regression polynomial ($\beta_i$) during training and uses the trained regression model while calculating the velocity $V_2$ of the second subsurface layer during real time computation of velocity of second subsurface layer in the graph theory-based seismic model 600.

Having learned the value of coefficients of regression polynomial ($\beta_i$), referring back to FIG. 1, the signal processing circuitry 116 puts the value of second largest absolute value of the eigenvalues (x) as well as the learned coefficients of regression polynomial ($\beta_i$) into equation 21 as below:

$$\hat{V}_2 = \beta_0 + \beta_1 x + \beta_2 x^2 + \beta_3 x^3 + \beta_4 x^4, \tag{21}$$

The solution of the equation 21 yields the value of velocity of the second subsurface layer. Accordingly, the signal processing circuitry 116 calculates the velocity of the seismic waves in the second layer ($V_2$) of the geologic formation by fitting data points of the three selected seismic traces, trace 1, trace 7 and trace 13, to extract the second largest value of the eigenvalue to each coefficient of the quartic regression polynomial. This velocity value corresponds to the single adjacency matrix, out of 21 adjacency matrices. The point of consideration here is that there are 20 remaining such second highest eigenvalues for each 20 adjacency matrix. Accordingly, the signal processing circuitry 116 repeats the computation of 20 different velocity values of the second subsurface layer ($V_2$) for remaining 20 different adjacency matrices. The calculated velocity values of the second subsurface layer ($V_2$) ranges from 640 m/s to 780 m/s. The signal processing circuitry 116 simultaneously calculates the reflection times corresponding to the 21 different $V_2$ values. As such, the signal processing circuitry 116 calculates 21 different velocity values $V_2$ that range between 640 m/s to 780 m/s.

Once the 21 different velocity values ($V_2$) for the second subsurface layer are calculated along with the reflection times corresponding to the 21 different $V_2$ values, the signal processing circuitry 116 further calculates a root-mean-square (RMS) error between the velocity ($V_2$) calculated using the graph theory and using the reflection travel time for each of the three selected seismic traces that is for all 21 different adjacency matrices. The optimum value of the velocity ($V_2$) value is the one that shows the minimum RMS error is the final calculated velocity value ($V_2$) of the second subsurface layer, out of total 21 different velocity values. The signal processing circuitry 116 thus selects the velocity ($V_2$) that has the lowest root-mean-square error out of the total 21 different velocity values, as the velocity of the seismic waves in the second layer ($V_2$) of the geologic formation 108. Accordingly, this completes the computation of seismic velocity ($V_2$) in the second subsurface layer of the geologic formation 108.

The signal processing circuitry 116 transfers the selected velocity ($V_2$) to the coupled output device 120. The output device 120, such as a monitor or a display screen displays the value of the second subsurface layer ($V_2$) to the user. In order to confirm the result, a conventional velocity analysis method was used to find the value of the second subsurface layer ($V_2$). The velocity of the second subsurface layer $V_2$ found from the conventional technique was 612 m/s while the velocity of the second subsurface layer ($V_2$) found from the graph theory was 610 m/s. The difference between the actual value and the predicted value of the velocity of the second subsurface layer ($V_2$) was found to be only 0.28%. This confirms an accurate result prediction of the velocity of the second subsurface layer ($V_2$) using the graph theory method used in the present invention, with much lower computational cost.

In an aspect of the present disclosure, the computing unit 112 includes a database 118 of known velocities of seismic wave propagation in materials. The database 118 is operatively connected to the signal processing circuitry 116 of the computing unit 112. When the signal processing circuitry 116 determines the velocity of the second subsurface layer ($V_2$), the signal processing circuitry 116 matches the velocity of the second subsurface layer ($V_2$) to a corresponding material listed in the database. Based upon matching, the signal processing circuitry 116 determines the material of the second subsurface layer of the geologic formation 108 and displays the material name on the output device 120. Therefore, by matching the velocity of the seismic waves in the second subsurface layer to a record in the database of known velocities of seismic wave propagation in materials, the signal processing circuitry 116 of the computing unit 112 may easily indicate the material present within the second subsurface layer and display the material on the output device 120.

In an aspect of the present disclosure, the computing unit 112 may also display the presence of the material inside the earth along with the seismic velocity on a dedicated map. In order to display the map containing the velocity of the second subsurface layer along with the material present in the second subsurface layer, initially a geologic survey of the second subsurface layer of the geologic formation 108 at a plurality of seismic source 104/seismic wave receiver 106 locations is conducted by the aforementioned graph theory-based computation of the seismic velocity in the second subsurface layer. The conduction of the geologic survey of the second subsurface layer of the geologic formation at a plurality of seismic source/seismic wave receiver locations is executed by consecutively moving the seismic source 104 to the location of the seismic wave receiver 106 of the fixed array of seismic wave receivers 106 and generating a shot by the seismic source 104 and recording a shot gather by the seismic wave receivers 106. In an aspect of the present disclosure, the conduction of the geologic survey of the second subsurface layer of the geologic formation at a plurality of seismic source/seismic wave receiver locations is executed by consecutively moving the seismic source 104 to the location of seismic wave receiver 106 of a rolling array of seismic wave receivers 106 and generating a shot by the seismic source 104 and activating the subset of the seismic wave receivers 106 to receive the seismic waves and recording a shot gather. As such, in either case, the velocity of the second subsurface layer ($V_2$) is calculated by the computing unit 112 using the graph theory approach. Once the geologic survey is complete, the computing unit 112 stores the velocity of the second subsurface layer ($V_2$) at the plurality of locations. Next, the computing unit 112 compares the velocity of the second subsurface layer ($V_2$) at the plurality of locations with the material corresponding to the second subsurface layer ($V_2$) at those locations. The signal processing circuitry 116 then generates a map of the geologic formation. The map displays the velocity of the seismic waves within the second subsurface layer and the material of the second subsurface layer for each seismic source/seismic wave receiver location. The map may also be displayed at the output device 120. The computing unit 112 may include a graphic processing unit (GPU), such as accelerated graphic card, for example NVidia, Asus, Intel or any supported graphic card, to display the enhanced contrast of different materials corresponding to material of the second subsurface layer for each seismic source/seismic wave receiver location on the map, along with the velocity of second subsurface layer ($V_2$) present at those locations.

Figure 7A:
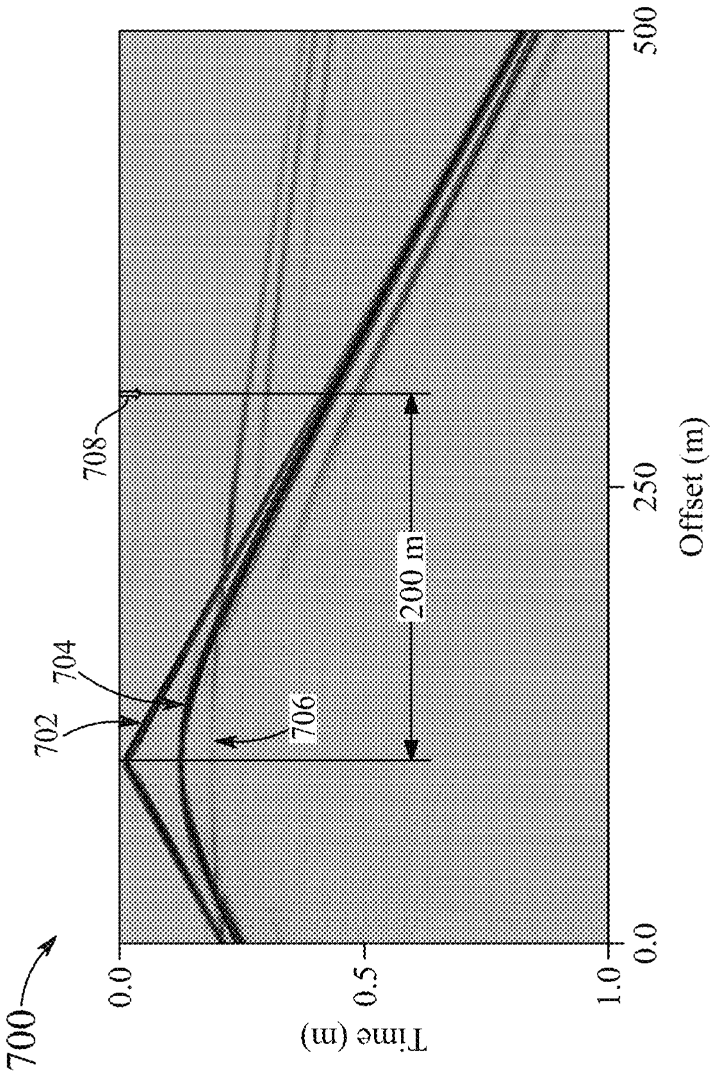
FIG. 7A illustrates one sample of generated shot gathers using a finite-difference solution to an acoustic wave equation during data generation using a synthetic model, according to certain embodiments.

FIG. 7A illustrates one sample of generated shot gathers 700 using a finite-difference solution to the acoustic wave equation during data generation using the synthetic model. Arrow 708 indicates the location of the trace used in the common mid-point (CMP) gather during synthetic data generation. The rays 702, 704 and 706 indicate direct arrival waves, waves corresponding to reflection from the first boundary, and waves corresponding to waves reflected from the second boundary, respectively. The value of velocity of the second subsurface layer ($V_2$) calculated using the graph theory was 1500.18 m/s while the true value as the chosen value was 1500 m/s for the second subsurface layer ($V_2$) during synthetic data generation. Therefore, the current approach of using the graph theory-based computation of the velocity of second subsurface layer ($V_2$) shows an error of only 0.012%.

Figure 7B:
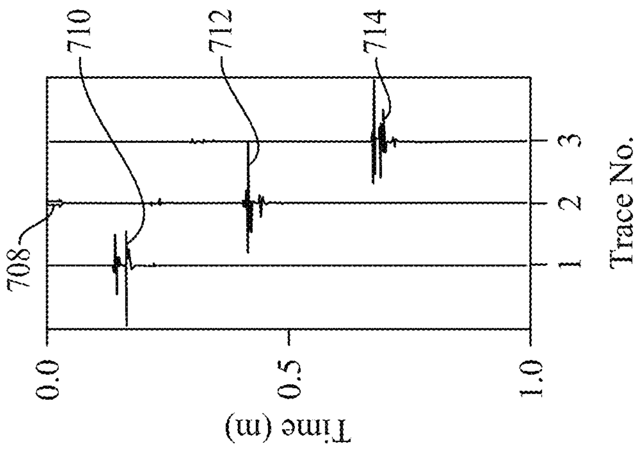
FIG. 7B illustrates a common mid-point data extraction from the synthetic data, according to certain embodiments.

FIG. 7B illustrates a common mid-point data extraction from the synthetic data, according to an aspect. The main seismic events are a direct wave 710 which is represented by a trace 1 between source receiver pairs ($S_3$ to $R_3$), a refracted wave 712 which is represented by a trace 2 between the source receiver pairs ($S_2$ to $R_3$) and a refracted waves 714 which is represented by a trace 3 between the source receiver pair ($S_1$ to $R_1$), respectively. Arrow 708 corresponds to the trace marked in FIG. 7A.

Figure 8A:
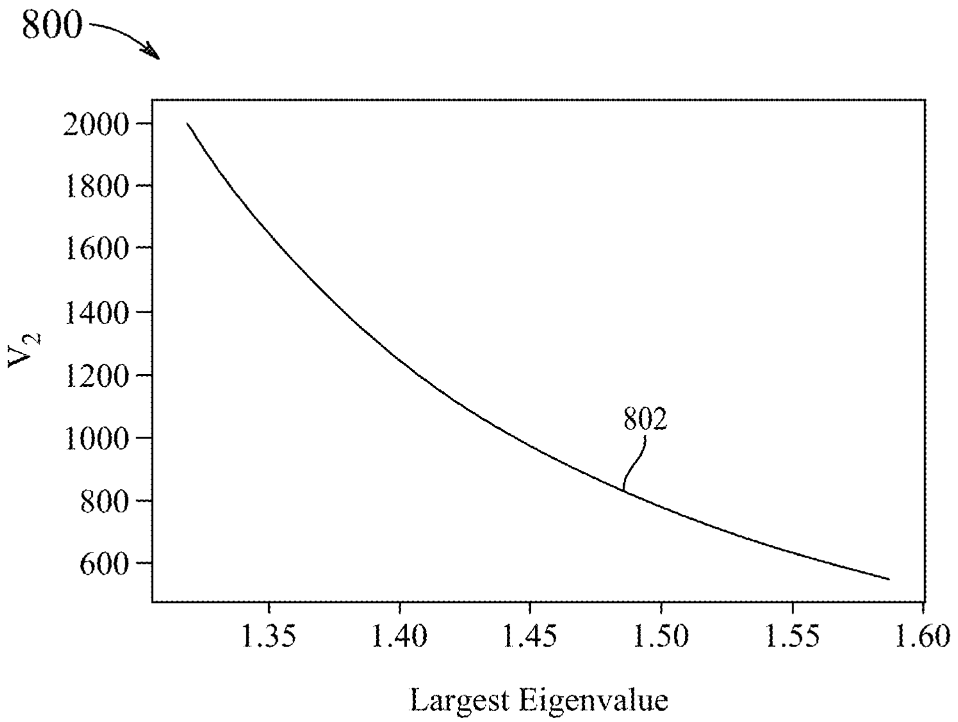
FIG. 8A illustrates a graph showing a relationship between calculated second eigenvalues (x) and corresponding model velocities $V_2$ during synthetic data generation, according to certain embodiments.

FIG. 8A illustrates a graph 800 showing a relationship between the calculated second eigenvalues (x) and the corresponding model velocities $V_2$ during synthetic data generation. The x axis shows values of second eigenvalues (x) whereas the curve 802 on the Y axis shows values of the velocity of the second sublayer ($V_2$) corresponding to the second largest values of eigenvalues (x). It was observed that the similar relationships were not observed between the velocities and other eigenvalues (x). As a result, the second largest eigenvalue was identified as a suitable predictor variable to be used in the quadratic regression polynomial in equation 19. Based on the curves 802, it was identified that a strong nonlinear relationship exists between the second largest eigenvalues of the normalized Laplacian and velocities of the second subsurface layer ($V_2$).

Figure 8B:
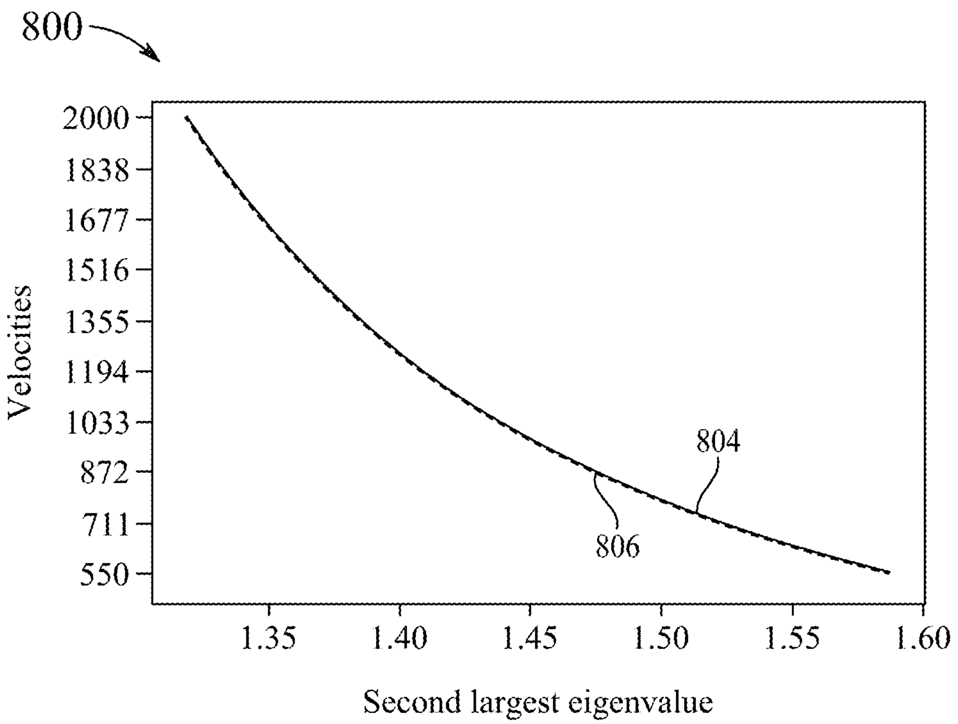
FIG. 8B illustrates a graphical comparison of approximate and exact values of the velocities of the second subsurface layer ($V_2$) using a regression model during synthetic data generation while using training data, according to certain embodiments.

FIG. 8B illustrates a graphical comparison of the approximate and exact values of the velocities of the second subsurface layer ($V_2$) using the regression model during synthetic data generation while using the training data. A curve 804 indicates the actual value of the velocities of the second subsurface layer ($V_2$) while using the training data whereas a curve 806 indicates the estimated value of the velocities of the second subsurface layer ($V_2$) while using the training data by the regression model during synthetic data generation. It was observed that the regression model yields a good prediction of the velocities of the second subsurface layer ($V_2$).

Figure 8C:
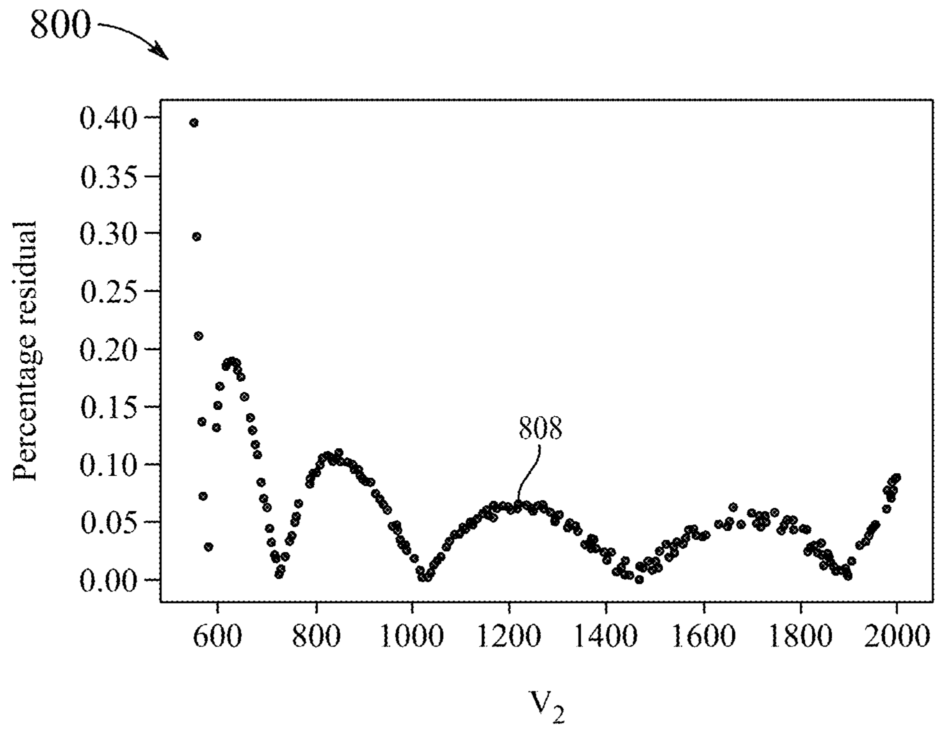
FIG. 8C illustrates a graphical representation of percentage error ($P_e$) in computing velocities of second subsurface layer ($V_2$) while using the training data, according to certain embodiments.

FIG. 8C illustrates a graphical representation of the percentage error ($P_e$) in computing the velocities of the second subsurface layer ($V_2$) while using the training data. The formula for calculating the percentage residual error ($P_e$) to measure the accuracy of the estimations while using the training data, is provided as below:

$$P_e = \frac{|V_2 - \hat{V}_2|}{|V_2|},$$

A curve 808 shows a pattern of the percentage residual error from the regression model while using the training data.

Figure 8D:
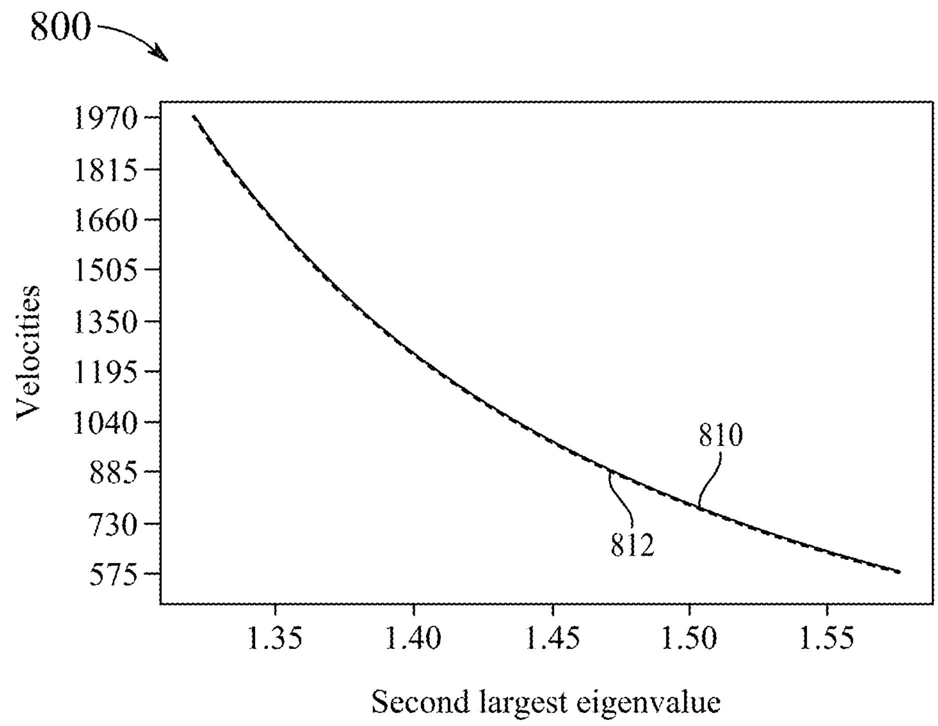
FIG. 8D illustrates a graphical comparison of approximate and exact values of velocities of the second subsurface layer ($V_2$) using regression model during synthetic data generation while using testing data, according to certain embodiments.

FIG. 8D illustrates a graphical comparison of the approximate and exact values of the velocities of the second subsurface layer ($V_2$) using the regression model during synthetic data generation while using the testing data. To demonstrate the generalization of the regression model, some test data were applied that were not used in training the regression model. A curve 810 indicates an actual value of velocities of the second subsurface layer ($V_2$) while using the testing data whereas a curve 812 indicates the estimated value of the velocities of the second subsurface layer ($V_2$) while using the testing data by the regression model during synthetic data generation. It was seen that the regression model produced a good prediction of the velocities of the second subsurface layer ($V_2$) even after applying test data that was not used to train the regression model. The regression model was clearly able to predict the previously unseen data with a maximum percentage error of about 0.2%.

Figure 8E:
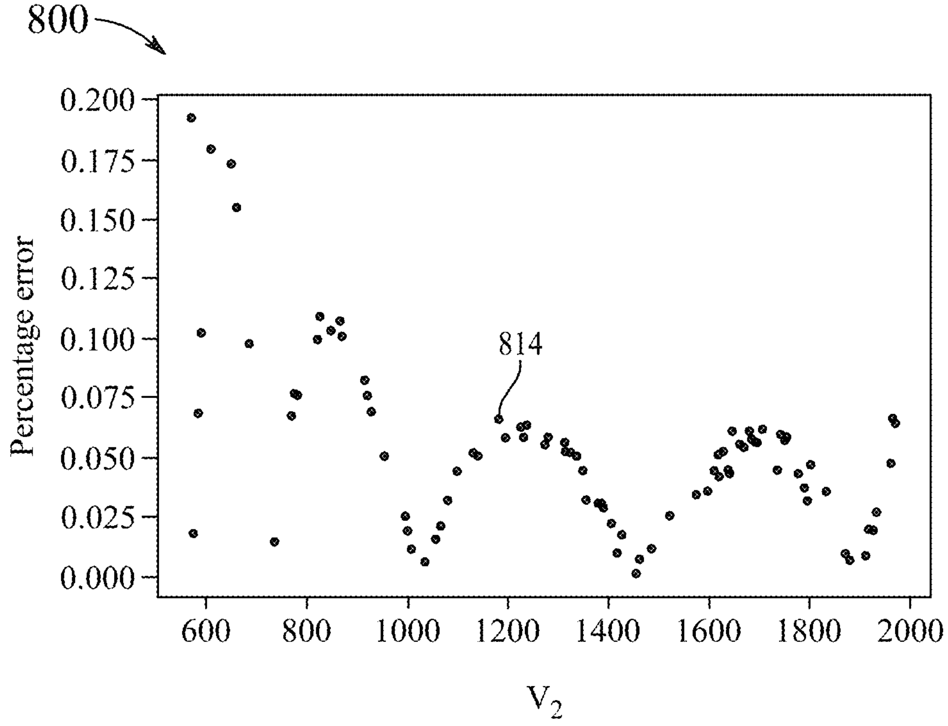
FIG. 8E illustrates a graphical representation of percentage error ($P_e$) in computing the velocities of the second subsurface layer ($V_2$) while using the testing data, according to certain embodiments.

FIG. 8E illustrates a graphical representation of the percentage error ($P_e$) in calculating the velocities of the second subsurface layer ($V_2$) while using the testing data. In this case, the percentage error was found to be only 0.1%. For this test data, the absolute error in approximating $V_2$ from the second largest eigenvalues of the normalized Laplacian, by the regression model was found to be less than $0.001 \times V_2$. The curve 814 shows the pattern of the percentage residual error from the regression model while using the testing data.

Figure 8F:
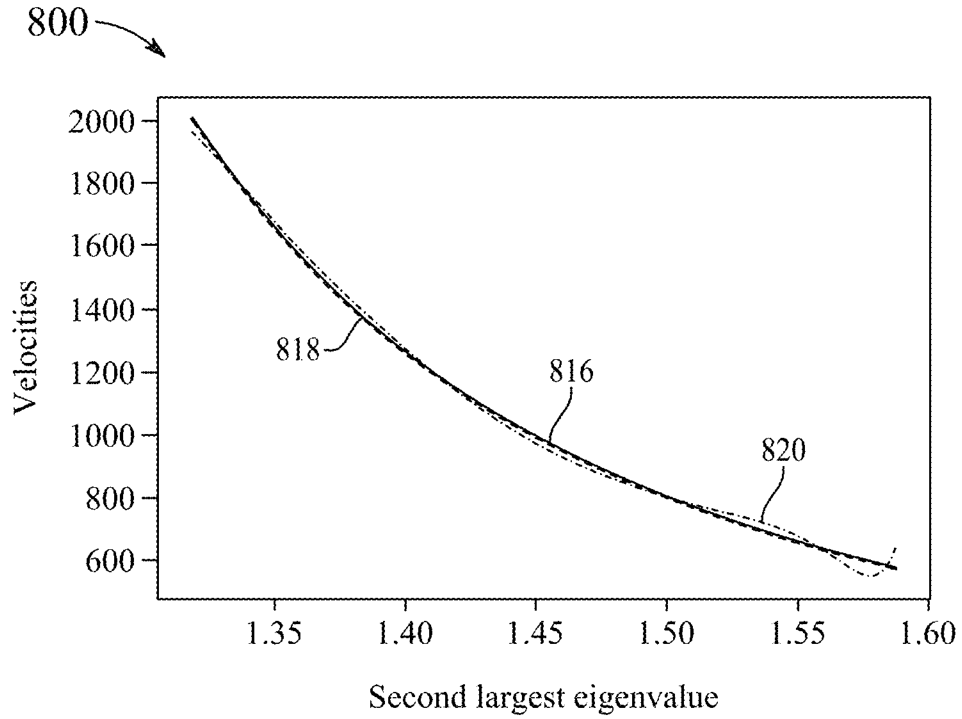
FIG. 8F illustrates a graphical representation of comparing approximations from second largest eigenvalues of the normalized Laplacian with respect to the weighted adjacency matrix in predicting the training data, according to certain embodiments.

FIG. 8F illustrates a graphical representation of comparing approximations from second largest eigenvalues of the normalized Laplacian with respect to the weighted adjacency matrix in predicting the training data. Each of the curves 816, 818 and 820 indicate velocity curves due to weighted adjacency matrix, velocity curve of the actual values of the velocity, and the velocity curve due to normalized Laplacian matrix, respectively. From the three curves it was clear that the regression model shows a possible significant accuracy gains in using the spectrum of the normalized Laplacian of weighted graphs to predicted seismic velocity of the second subsurface layer while using the training data.

Figure 8G:
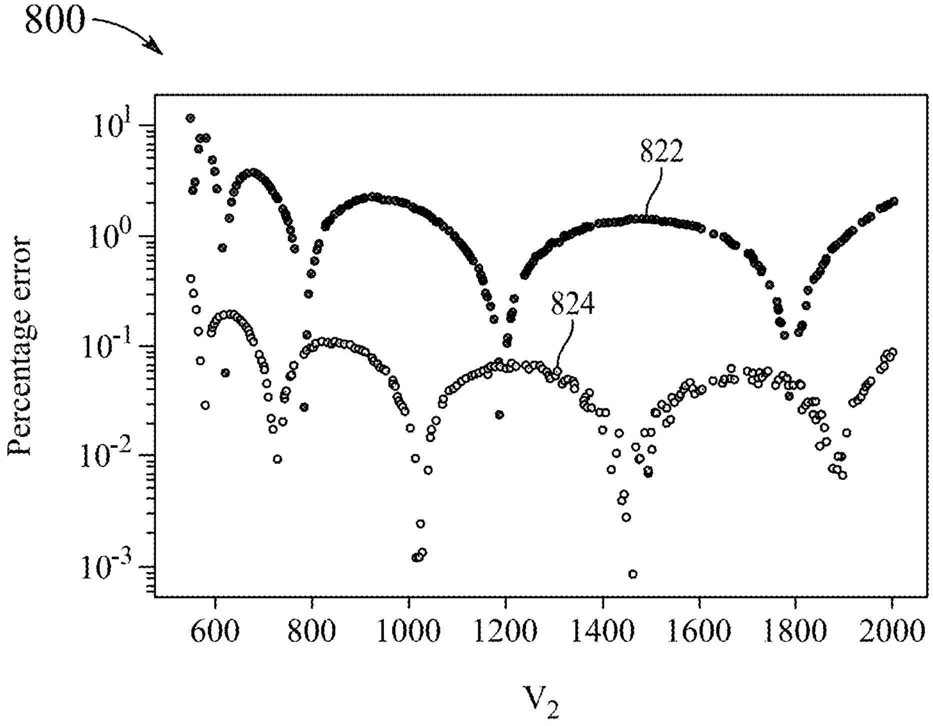
FIG. 8G illustrates a graphical representation of the percentage error ($P_e$) in computing the velocities of the second subsurface layer ($V_2$) while predicting the training data using the weighted adjacency matric and the normalized Laplacian matrix, according to certain embodiments.

FIG. 8G illustrates a graphical representation of the percentage error ($P_e$) in computing the velocities of the second subsurface layer ($V_2$) while predicting the training data using the weighted adjacency matric and the normalized Laplacian matrix. The formula for computation of the percentage residual error ($P_e$) was used to measure the accuracy of the estimations while using the training data. A curve 822 shows a pattern of the percentage residual error from the regression model in predicting the training data in the weighted adjacency matrix, whereas a graph 824 shows a pattern of the percentage residual error from the regression model n predicting the training data in the normalized Laplacian matrix.

Figure 8H:
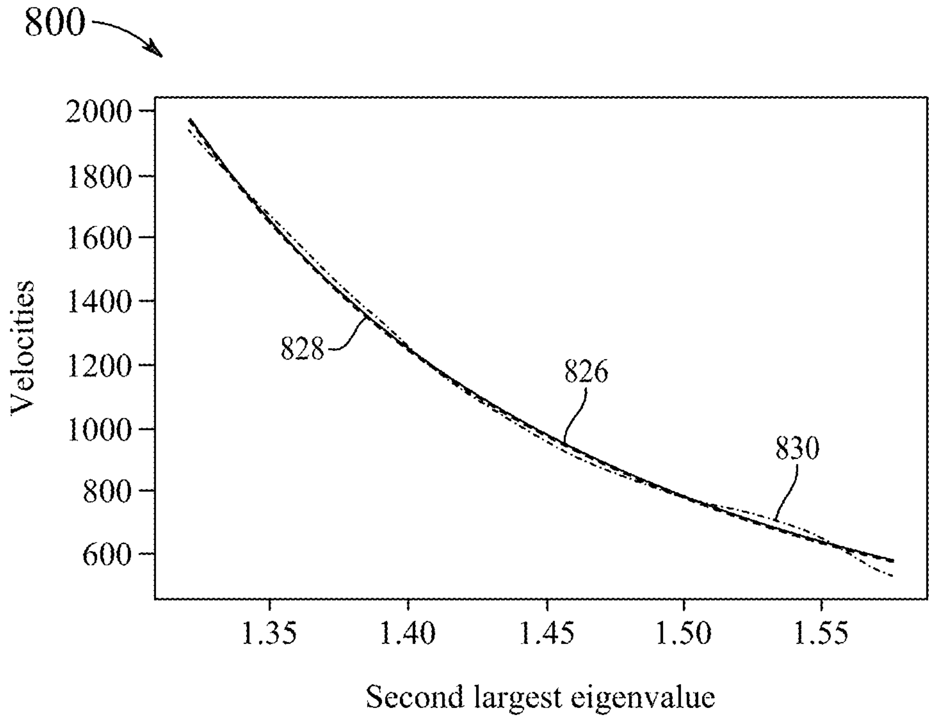
FIG. 8H illustrates a graphical representation of comparing approximations from second largest eigenvalues of the normalized Laplacian with respect to the weighted adjacency matrix in predicting the test data, according to certain embodiments.

FIG. 8H illustrates a graphical representation of comparing approximations from second largest eigenvalues of the normalized Laplacian with respect to the weighted adjacency matrix in predicting the test data. Curves 826, 828 and 830 indicate velocity curves due to the weighted adjacency matrix, the velocity curve of the actual values of the velocity in the second subsurface layer, and the velocity curve due to the normalized Laplacian matrix, respectively. From the three curves it is clear that the used regression model shows significant accuracy gains in using the spectrum of the normalized Laplacian of weighted graphs to predicted seismic velocity of the second subsurface layer, even when the regression model was tested with a new test data.

Figure 8I:
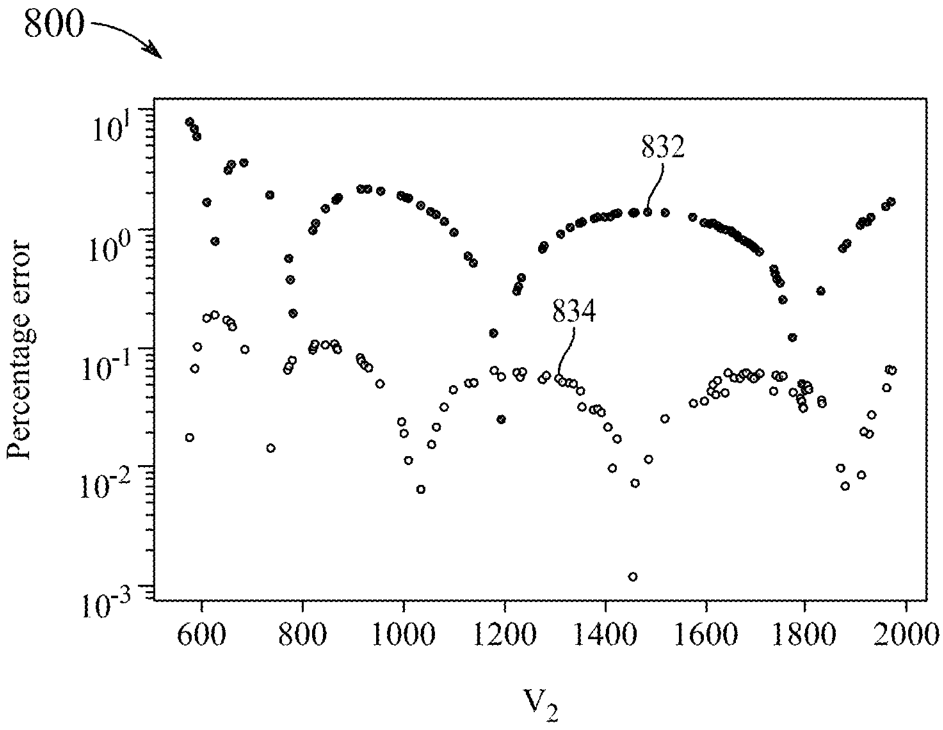
FIG. 8I illustrates a graphical representation of the percentage error ($P_e$) in computing the velocities of the second subsurface layer ($V_2$) while predicting the test data in the weighted adjacency matric and the normalized Laplacian matrix, according to certain embodiments.

FIG. 8I illustrates a graphical representation of the percentage error ($P_e$) in computing the velocities of the second subsurface layer ($V_2$) while predicting the test data in the weighted adjacency matric and the normalized Laplacian matrix. A curve 832 shows a pattern of the percentage residual error from the regression model while predicting the test data in the weighted adjacency matrix, whereas a curve 834 shows a pattern of the percentage residual error from the regression model while predicting the test data in the normalized Laplacian matrix.

Considering FIG. 8G and FIG. 8I, it was clear from the curves of the percentage residual error in both figures that the regression model used in the current invention easily predicts the velocity value for the second subsurface layer ($V_2$) by using the second highest value of the eigenvalue of the Laplacian matrix, compared to a previous model used in the prior art where the regression model predicted the velocity value for the second subsurface layer ($V_2$) by using the highest value of the eigenvalue. The results shows about a ten fold increase in accuracy when using the second highest eigenvalue compared to the cases where the highest value of eigenvalue was used to calculate the velocity value for the second subsurface layer ($V_2$).

Figure 9:
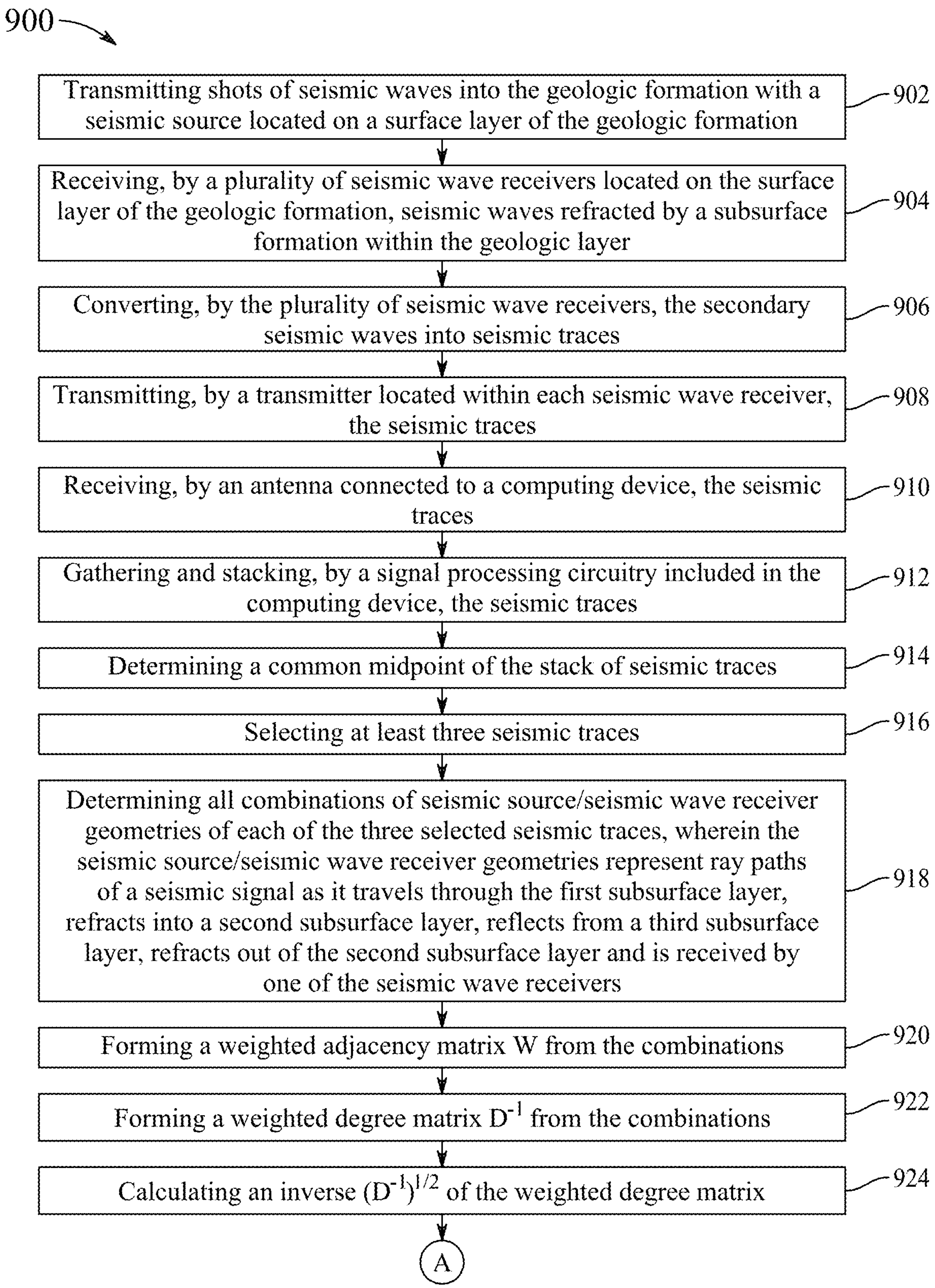
FIG. 9 illustrates a flow chart of a method for estimating a seismic velocity of a subsurface layer of a geologic formation.
Figure 9:
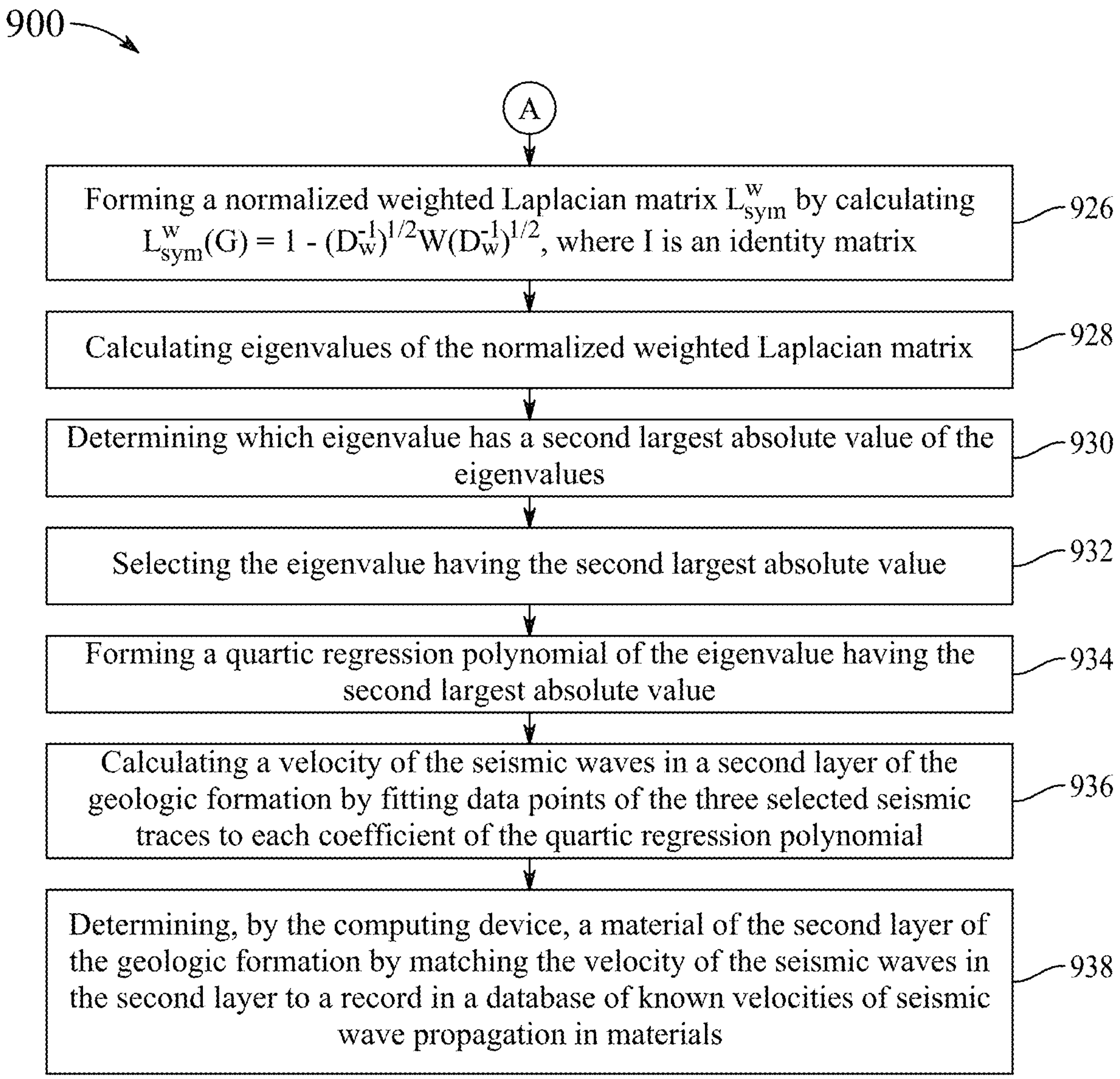

FIG. 9 illustrates a flowchart of a method 900 for estimating a seismic velocity of a subsurface layer of a geologic formation 108. The method is performed in the signal processing circuitry 116 of the computing unit 112 as described in FIG. 1. The method 900 is described in conjunction with FIGS. 1-7 and various experimental observation in FIG. 8. Various steps of the method 900 are included through blocks in FIG. 9. One or more blocks may be combined or eliminated to achieve the method of estimating the seismic velocity of a subsurface layer of a geologic formation 108, without departing from the scope of the present disclosure.

At step 902, the method 900 includes, transmitting shots of seismic waves into the geologic formation 108 with a seismic source 104 located on a surface layer 102 of the geologic formation 108.

At step 904, the method 900 includes receiving, by a plurality of seismic wave receivers 106 located on the surface layer 102 of the geologic formation 108, seismic waves 124 refracted by a subsurface formation within the geologic layer.

At step 906, the method 900 includes converting, by the plurality of seismic wave receivers 106, the secondary seismic waves 124 into seismic traces.

At step 908, the method 900 includes transmitting, by a transmitter 110 located within each seismic wave receiver 106, the seismic traces.

At step 910, the method 900 includes receiving, by an antenna 114 connected to a computing unit 112, the seismic traces.

At step 912, the method 900 includes gathering and stacking, by a signal processing circuitry 116 included in the computing unit 112, the seismic traces.

At step 914, the method 900 includes determining a common midpoint (CMP) of the stack of seismic traces.

At step 916, the method 900 includes selecting at least three seismic traces by the signal processing circuitry 116.

At step 918, the method 900 includes determining all combinations of seismic source/seismic wave receiver geometries of each of the three selected seismic traces. The seismic source/seismic wave receiver geometries represent ray paths of a seismic signal as it travels through the first subsurface layer, refracts into a second subsurface layer, reflects from a third subsurface layer, refracts out of the second subsurface layer and is received by one of the seismic wave receivers 106.

At step 920, the method 900 includes forming a weighted adjacency matrix W from the combinations.

At step 922, the method 900 includes forming a weighted degree matrix $D^{-1}$ from the combinations.

At step 924, the method 900 includes calculating an inverse (D−1)½ of the weighted degree matrix.

At step 926, the method 900 includes forming a normalized weighted Laplacian matrix $$L_{sym}^{w}$$

by calculating $$L_{sym}^{w}(G) = I - \left(D_w^{-1}\right)^{\frac{1}{2}} W \left(D_w^{-1}\right)^{\frac{1}{2}},$$

where I is an identity matrix.

At step 928, the method 900 calculating eigenvalues of the normalized weighted Laplacian matrix;

At step 930, the method 900 includes determining which eigenvalue has a second largest absolute value of the eigenvalues.

At step 932, the method 900 includes selecting the eigenvalue having the second largest absolute value.

At step 934, the method 900 includes forming a quartic regression polynomial of the eigenvalue having the second largest absolute value.

At step 936, the method 900 includes calculating a velocity of the seismic waves in a second layer of the geologic formation 108 by fitting data points of the three selected seismic traces to each coefficient of the quartic regression polynomial.

At step 938, the method 900 includes determining, by the signal processing circuitry 116, a material of the second layer of the geologic formation 108 by matching the velocity of the seismic waves 124 in the second layer to a record in a database of known velocities of seismic wave propagation in materials.

In comparison with the prior disclosed article by the inventors, titled "Approximation of seismic velocities from the spectrum of weighted graphs", published in March 2023*GEM—International Journal on Geomathematics* 14(1), Vo. 14, Article #5, on Mar. 13, 2023, which is incorporated herein by reference in its entirety, the methods and system of the present disclosure have a relative error less than 0.1%, where the error of the prior disclosed article have a relative error less than 4%, which constitutes an improvement in accuracy of about 40%. The graph theory approach using the second largest eigenvalue of the Laplacian was applied to field data and it was observed to estimate the seismic velocity with about a 0.28% relative error.

Embodiments are illustrated with respect to FIG. 1 to FIG. 9. A system 100 for estimating a seismic velocity of a subsurface layer of a geologic formation 108 is described. The system 100 includes a seismic source 104 located on a surface layer 102 of the geologic formation 108. The seismic source 104 is configured to transmit shots of seismic waves 124 into the geologic formation 108. The system 100 further includes a plurality of seismic wave receivers 106 located on the surface layer 102 of the geologic formation 108. Each seismic wave receiver 106 is configured to receive seismic waves 124 refracted from a subsurface formation within the geologic layer and convert the secondary seismic waves into seismic traces. The system 100 further includes a transmitter 110 located within each seismic wave receiver 106. The transmitter 110 is configured to transmit the seismic traces. The system 100 further includes a computing unit 112. The computing unit 112 includes an antenna 114 configured to receive the seismic traces. The computing unit 112 further includes a signal processing circuitry 116. The signal processing circuitry 116 is configured to gather and stack the seismic traces. The signal processing circuitry 116 is further configured to determine a common midpoint of the stack of seismic traces. The signal processing circuitry 116 is further configured to determine a velocity of seismic waves of a first subsurface layer of the geologic formation 108 from a geometrical evaluation of direct wave arrivals of the seismic traces. The signal processing circuitry 116 is further configured to select at least three seismic traces. The signal processing circuitry 116 is further configured to determine all combinations of seismic source/seismic wave receiver geometries of each of the three selected seismic traces. The seismic source/seismic wave receiver geometries represent ray paths of a seismic signal as it travels through the first subsurface layer, refracts into a second subsurface layer, reflects from a third subsurface layer, refracts out of the second subsurface layer and is received by one of the seismic wave receivers 106. The signal processing circuitry 116 is further configured to form a weighted adjacency matrix W from the combinations. The signal processing circuitry 116 is further configured to form a weighted degree matrix $D^{-1}$ from the combinations. The signal processing circuitry 116 is further configured to calculate an inverse $(D^{-1})^{1/2}$ of the weighted degree matrix. The signal processing circuitry 116 is further configured to form a normalized weighted Laplacian matrix $$L_{sym}^{w}$$

by calculating $$L_{sym}^{w}(G) = I - (D_w^{-1})^{\frac{1}{2}} W (D_w^{-1})^{\frac{1}{2}},$$

where I is an identity matrix. The signal processing circuitry 116 is further configured to calculate eigenvalues of the normalized weighted Laplacian matrix. The signal processing circuitry 116 is further configured to determine which eigenvalue has a second largest absolute value of the eigenvalues. The signal processing circuitry 116 is further configured to select the eigenvalue having the second largest absolute value. The signal processing circuitry 116 is further configured to form a quartic regression polynomial of the eigenvalue having the second largest absolute value. The signal processing circuitry 116 is further configured to calculate a velocity of the seismic waves in a second subsurface layer of the geologic formation by fitting data points of the three selected seismic traces (calculated eigenvalues x) to each coefficient of the quartic regression polynomial. The computing unit 112 further includes a database 118 of known velocities of seismic wave propagation in materials operatively connected to the signal processing circuitry 116. The signal processing circuitry 116 is configured to determine a material of the second layer of the geologic formation 108 by matching the velocity of the seismic waves in the second layer to a record in the database 118 of known velocities of seismic wave propagation in materials.

In an aspect, the plurality of seismic wave receivers 106 are a fixed array of seismic wave receivers 106 and the seismic source 104 is consecutively moved to each seismic wave receiver location, a shot is generated by the seismic source 104 and a shot gather is recorded by the seismic wave receivers 106.

In an aspect, the plurality of seismic wave receivers 106 are a rolling array of seismic wave receivers 106 in which the seismic source 104 is consecutively moved to a seismic wave receiver 106 location, a shot is generated by the seismic source 104 and a subset of the seismic wave receivers 106 are activated to receive the seismic waves.

In an aspect, the plurality of seismic wave receivers 106 are geophones.

In an aspect, a weight of each ray path represents a distance travelled by the seismic wave as it travels through the first subsurface layer and the second subsurface layer of the geologic formation 108 from the seismic source 104 to one of the plurality of seismic wave receivers 106, such that: a first ray path is defined as extending from a vertex at the seismic source to a vertex at a first refraction point on the second subsurface layer. The weight of the first ray path is a distance measured parallel to the surface layer from the location of the seismic source 104 to a projection of the first refraction point on the surface layer 102. A second ray path is defined as extending from the vertex at the first refraction point on the second subsurface layer to a vertex at the reflection point of the third subsurface layer. The weight of the second ray path equals a distance measured parallel to the surface layer from the projection of the refraction point on the surface layer 102 to the common midpoint M. A third ray path is defined as extending from the vertex at the reflection point of the third subsurface layer to a vertex at a second refraction point on the second subsurface layer. The weight of the third ray path equals a distance measured parallel to the surface layer 102 from the common midpoint M to a projection of the second refraction point on the surface layer 102. A fourth ray path is defined as extending from the vertex at the second refraction point at the second subsurface layer to the one of the seismic wave receivers 106. The weight of the fourth ray path equals a distance measured parallel to the surface layer 102 from the projection of the second refraction point on the surface layer 102 to the one of the seismic wave receivers 106. A fifth ray path is defined as the distance parallel to the surface layer 102 from the location of the seismic source 104 to the location of the one of the seismic wave receivers 106.

A velocity of the seismic wave within the first subsurface layer of the geologic formation 108 is calculated by a geometrical evaluation of direct wave arrivals of the seismic traces.

The velocity $\hat{V}_2$ of the seismic wave within the second subsurface layer is calculated, by the signal processing circuitry 116, by solving a quartic regression polynomial having the form:

$$\hat{V}_2 = \beta_0 + \beta_1 x + \beta_2 x^2 + \beta_3 x^3 + \beta_4 x^4,$$

where x is the eigenvalue having the second largest absolute value, and β0, β1, β2, β3 and β4 are the coefficients of the quartic regression polynomial.

In an aspect, the system 100 further includes a map of the geologic formation configured to show the velocity of the seismic waves within the second subsurface layer and the material of the second subsurface layer for each seismic source/seismic wave receiver location. The map is generated by conducting a geologic survey of the second subsurface layer of the geologic formation at a plurality of seismic source/seismic wave receiver locations, determining, by the signal processing circuitry 116, the velocity and the material of the second subsurface layer for each seismic source/seismic wave receiver location, and generating, by the signal processing circuitry 116, the map.

In another aspect, a method for estimating a seismic velocity of a subsurface layer of a geologic formation 108 is described. The method includes transmitting shots of seismic waves into the geologic formation 108 with a seismic source 104 located on a surface layer 102 of the geologic formation 108. The method further includes receiving, by a plurality of seismic wave receivers 106 located on the surface layer 102 of the geologic formation 108, seismic waves refracted by a subsurface formation within the geologic layer. The method further includes converting, by the plurality of seismic wave receivers 106, the secondary seismic waves into seismic traces. The method further includes transmitting, by a transmitter 110 located within each seismic wave receiver 106, the seismic traces. The method further includes receiving, by an antenna 114 connected to a computing unit including signal processing circuitry 116, the seismic traces. The method further includes gathering and stacking, by the signal processing circuitry 116, the seismic traces. The method further includes determining a common midpoint of the stack of seismic traces. The method further includes selecting at least three seismic traces. The method further includes determining all combinations of seismic source/seismic wave receiver geometries of each of the three selected seismic traces. The seismic source/seismic wave receiver geometries represent ray paths of a seismic signal as it travels through the first subsurface layer, refracts into a second subsurface layer, reflects from a third subsurface layer, refracts out of the second subsurface layer and is received by one of the seismic wave receivers. The method further includes forming a weighted adjacency matrix W from the combinations. The method further includes forming a weighted degree matrix $D^{-1}$ from the combinations. The method further includes calculating an inverse $(D^{-1})^{1/2}$ of the weighted degree matrix. The method further includes forming a normalized weighted Laplacian matrix $$L_{sym}^{w}$$

by calculating $$L_{sym}^{w}(G)=I-\left(D_{w}^{-1}\right)^{\frac{1}{2}}W\left(D_{w}^{-1}\right)^{\frac{1}{2}},$$

where I is an identity matrix. The method further includes calculating eigenvalues of the normalized weighted Laplacian matrix. The method further includes determining which eigenvalue has a second largest absolute value of the eigenvalues. The method further includes selecting the eigenvalue having the second largest absolute value. The method further includes forming a quartic regression polynomial of the eigenvalue having the second largest absolute value. The method further includes calculating a velocity of the seismic waves in a second layer of the geologic formation by fitting data points of the three selected seismic traces to each coefficient of the quartic regression polynomial. The method further includes determining, by the signal processing circuitry 116, a material of the second layer of the geologic formation 108 by matching the velocity of the seismic waves in the second layer to a record in a database 118 of known velocities of seismic wave propagation in materials.

In an aspect, the method further includes consecutively moving the seismic source 104 to a seismic wave receiver 106 location of a fixed array of seismic wave receivers 106, generating a shot by the seismic source 104 and recording a shot gather by the seismic wave receivers 106.

In an aspect, the method further includes consecutively moving the seismic source 104 to a seismic wave receiver 106 location of a rolling array of seismic wave receivers 106, generating a shot by the seismic source 104 and activating a subset of the seismic wave receivers 106 to receive the seismic waves.

In an aspect, the plurality of seismic wave receivers 106 are geophones.

The method further includes representing, by the signal processing circuitry 116, a weight of each ray path by a distance travelled by the seismic wave as it travels through the subsurface layers of the geologic formation 108 from the seismic source 104 to one of the plurality of seismic wave receivers. The method further includes defining a first ray path as extending from a vertex at the seismic source 104 to a vertex at a first refraction point on the second subsurface layer. The method further includes determining the weight of the first ray path by measuring the distance parallel to the surface layer 102 from the location of the seismic source 104 to a projection of the first refraction point on the surface layer 102. The method further includes defining a second ray path as extending from the vertex at the first refraction point on the second subsurface layer to a vertex at the reflection point of the third subsurface layer. The method further includes determining the weight of the second ray path by measuring the distance parallel to the surface layer 102 from the projection of the second refraction point on the surface layer 102 to the common midpoint M. The method further includes defining a third ray path as extending from the vertex at the reflection point of the third subsurface layer to a vertex at a second refraction point on the second subsurface layer. The weight of the third ray path equals a distance measured parallel to the surface layer 102 from the common midpoint M to a projection of the second refraction point on the surface layer 102. The method further includes defining a fourth ray path as extending from the vertex at the second refraction point at the second subsurface layer to the one of the seismic wave receivers 106. The weight of the fourth ray path equals a distance measured parallel to the surface layer 102 from the projection of the second refraction point on the surface layer 102 to the one of the seismic wave receivers 106. The method further includes defining a fifth ray path as the distance parallel to the surface layer 102 from the location of the seismic source 104 to the location of the one of the seismic wave receivers 106.

The method includes calculating the velocity $V_2$ of the seismic wave within the second subsurface layer by solving a quartic regression polynomial having the form:

$$\hat{V}_2=\beta_0+\beta_1x+\beta_2x^2+\beta_3x^3+\beta_4x^4$$

where x is the eigenvalue having the second largest absolute value, and $\beta_0$, $\beta_1$, $\beta_2$, $\beta_3$ and $\beta_4$ are the coefficients of the quartic regression polynomial.

The method further includes determining the ray paths for each of the three selected traces. The method further includes forming a weighted adjacency matrix for each of the three selected traces from the ray paths. The method further includes forming a weighted adjacency matrix W for each of the three selected traces from the ray paths. The method further includes forming a weighted degree matrix $D^{-1}$ for each of the three selected traces using the weights of each ray path. The method further includes calculating an inverse $(D^{-1})^{1/2}$ of each of the weighted degree matrices. The method further includes forming a normalized weighted Laplacian matrix $$L_{sym}^{w}$$

by calculating $$L_{sym}^{w}(G)=I-\left(D_{w}^{-1}\right)^{\frac{1}{2}}W\left(D_{w}^{-1}\right)^{\frac{1}{2}},$$

where I is an identity matrix for each of the three selected traces. The method further includes calculating the eigenvalues of each of the normalized weighted Laplacian matrices. The method further includes determining the eigenvalues of each of the normalized weighted Laplacian matrices which have the second largest absolute value. The method further includes selecting the eigenvalues having the second largest absolute value for each of the normalized weighted Laplacian matrices. The method further includes forming a quartic regression polynomial for each of the eigenvalues having the second largest absolute value. The method further includes calculating the velocity of the seismic waves in the second layer of the geologic formation for each of the three selected seismic traces by fitting data points to each quartic regression polynomial. The method further includes calculating a root-mean-square error of the velocity for each of the three selected seismic traces. The method further includes selecting a velocity having a lowest root-mean-square error as the velocity of the seismic waves in the second layer of the geologic formation.

In an aspect, the method further includes conducting a geologic survey of the second subsurface layer of the geologic formation 108 at a plurality of seismic source/seismic wave receiver locations. The method further includes generating, by the signal processing circuitry 116, a map of the geologic formation 108. The map shows the velocity of the seismic waves within the second subsurface layer and the material of the second subsurface layer for each seismic source/seismic wave receiver location.

In an aspect, the method further includes determining a velocity of seismic waves of a first subsurface layer of the geologic formation 108 from a geometrical evaluation of direct wave arrivals of the seismic traces.

In another aspect, a method for conducting a geologic survey of a subsurface layer of the geologic formation 108 is described. The method includes installing a seismic source 104 on a surface layer 102 of the geologic formation 108. The seismic source 104 is configured to transmit shots of seismic waves into the geologic formation 108. The method further includes installing a plurality of seismic wave receivers 106 on the surface layer of the geologic formation 108. Each seismic wave receiver 106 is configured to receive seismic waves refracted from a subsurface formation within the geologic layer and convert the secondary seismic waves into seismic traces. The method further includes installing a transmitter 110 within each seismic wave receiver 106. The transmitter 110 is configured to transmit the seismic traces. The method further includes operatively connecting a computing unit 112 including signal processing circuitry 116 and an antenna 114 to receive the seismic traces. The signal processing circuitry 116 is configured for gathering and stacking the seismic traces. The signal processing circuitry 116 is further configured for determining a common midpoint of the stack of seismic traces. The signal processing circuitry 116 is further configured for selecting at least three seismic traces. The signal processing circuitry 116 is further configured for determining all combinations of seismic source/seismic wave receiver geometries of each of the three selected seismic traces. The seismic source/seismic wave receiver geometries represent ray paths of a seismic signal as it travels through the first subsurface layer, refracts into a second subsurface layer, reflects from a third subsurface layer, refracts out of the second subsurface layer and is received by one of the seismic wave receivers 106. The signal processing circuitry 116 is further configured for forming a weighted adjacency matrix W from the combinations. The signal processing circuitry 116 is further configured for forming a weighted degree matrix $D^{-1}$ from the combinations. The signal processing circuitry 116 is further configured for calculating an inverse $(D^{-1})^{1/2}$ of the weighted degree matrix. The signal processing circuitry 116 is further configured for forming a normalized weighted Laplacian matrix $$L_{sym}^{w}$$

by calculating $$L_{sym}^{w}(G) = I - (D_w^{-1})^{\frac{1}{2}} W (D_w^{-1})^{\frac{1}{2}},$$

where I is an identity matrix. The signal processing circuitry 116 is further configured for calculating eigenvalues of the normalized weighted Laplacian matrix. The signal processing circuitry 116 is further configured for determining which eigenvalue has a second largest absolute value of the eigenvalues. The signal processing circuitry 116 is further configured for selecting the eigenvalue having the second largest absolute value. The signal processing circuitry 116 is further configured for forming a quartic regression polynomial of the eigenvalue having the second largest absolute value. The signal processing circuitry 116 is further configured for calculating a velocity of the seismic waves in a second layer of the geologic formation by fitting data points of the three selected seismic traces to each coefficient of the quartic regression polynomial. The signal processing circuitry 116 is further configured for determining a material of the second layer of the geologic formation by matching the velocity of the seismic waves in the second layer to a record in a database 118 of known velocities of seismic wave propagation in materials.

In an aspect, the method further includes conducting the geologic survey of the second subsurface layer of the geologic formation at a plurality of seismic source/seismic wave receiver locations. The method further includes generating, by the signal processing circuitry 116, a map of the geologic formation. The map shows the velocity of the seismic waves within the second subsurface layer and the material of the second subsurface layer for each seismic source/seismic wave receiver location.

In an aspect, the method further includes conducting the geologic survey of the second subsurface layer of the geologic formation at a plurality of seismic source/seismic wave receiver locations by one of the method including consecutively moving the seismic source to a seismic wave receiver location of a fixed array of seismic wave receivers 106, generating a shot by the seismic source and recording a shot gather by the seismic wave receivers. Or consecutively moving the seismic source 104 to a seismic wave receiver 106 location of a rolling array of seismic wave receivers, generating a shot by the seismic source 104 and activating a subset of the seismic wave receivers 106 to receive the seismic waves.

Figure 10:
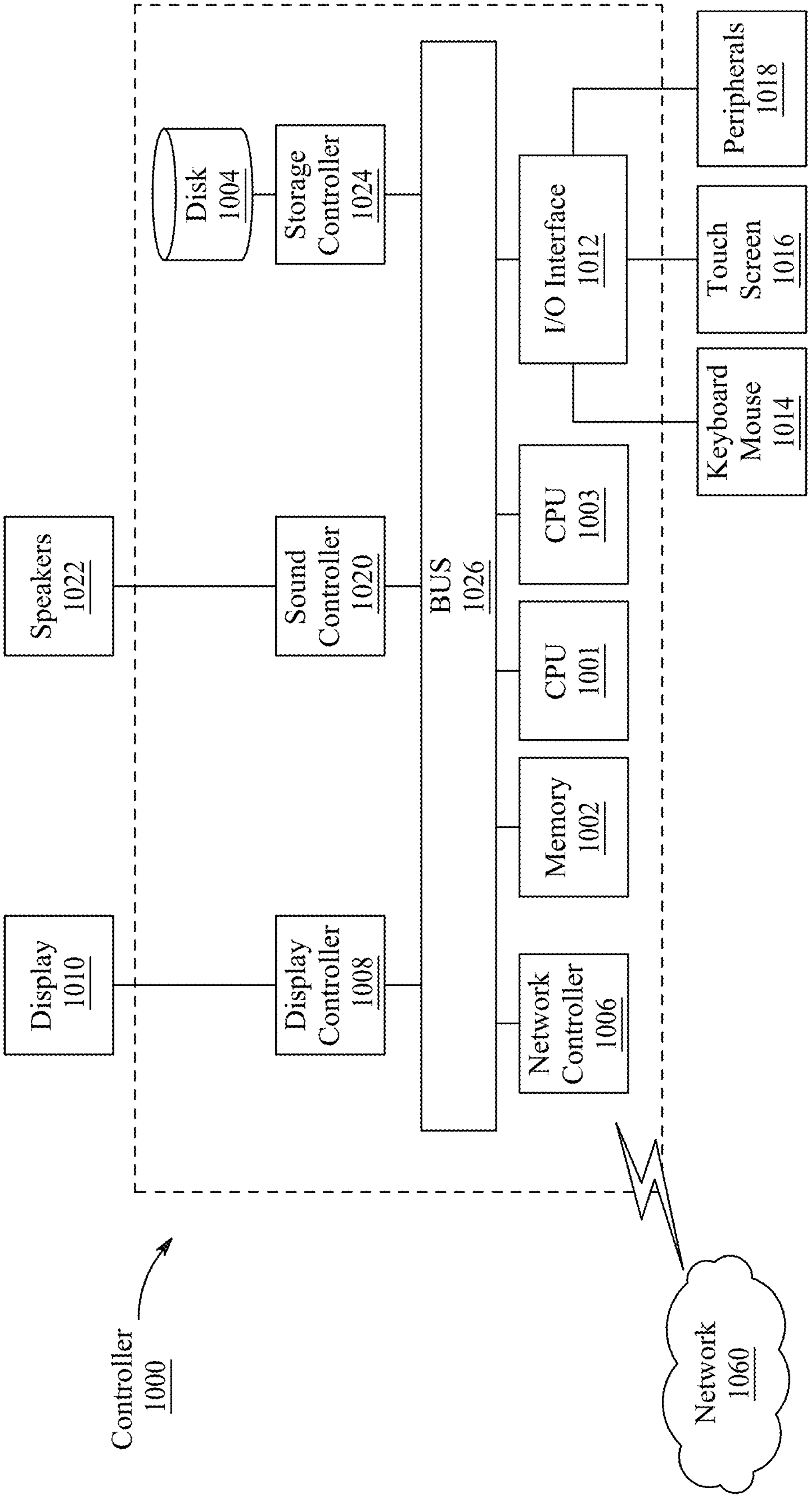
FIG. 10 is an illustration of a non-limiting example of details of computing hardware used in the computing system, according to certain embodiments.

Next, further details of the hardware description of the computing environment according to exemplary aspects of the present disclosure are described with reference to FIG. 10. In FIG. 10, a controller 1000 described is representative of the computing unit 112 configured for estimating a seismic velocity of a second subsurface layer of the geologic formation of FIG. 1 in which the controller 1000 is a computing device which includes a CPU 1001 which performs the processes described above/below. The process data and instructions may be stored in memory 1002. These processes and instructions may also be stored on a storage medium disk 1004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1001, 1003 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1001 or CPU 1003 may be a Xenon or Core processor from Intel of America or an Opteron processor from AMD of America, or may be other processor types that would be recognized by one of ordinary skill in the art. Alternatively, the CPU 1001, 703 may be implemented on an FPGA, ASIC, PLD or using discrete logic circuits, as one of ordinary skill in the art would recognize. Further, CPU 1001, 703 may be implemented as multiple processors cooperatively working in parallel to perform the instructions of the inventive processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G, 4G and 5G wireless cellular systems. The wireless network can also be Wi-Fi, Bluetooth, or any other wireless form of communication that is known.

The computing device further includes a display controller 1008, such as a NVIDIA GeForce GTX or Quadro graphics adaptor from NVIDIA Corporation of America for interfacing with display 610, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general-purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
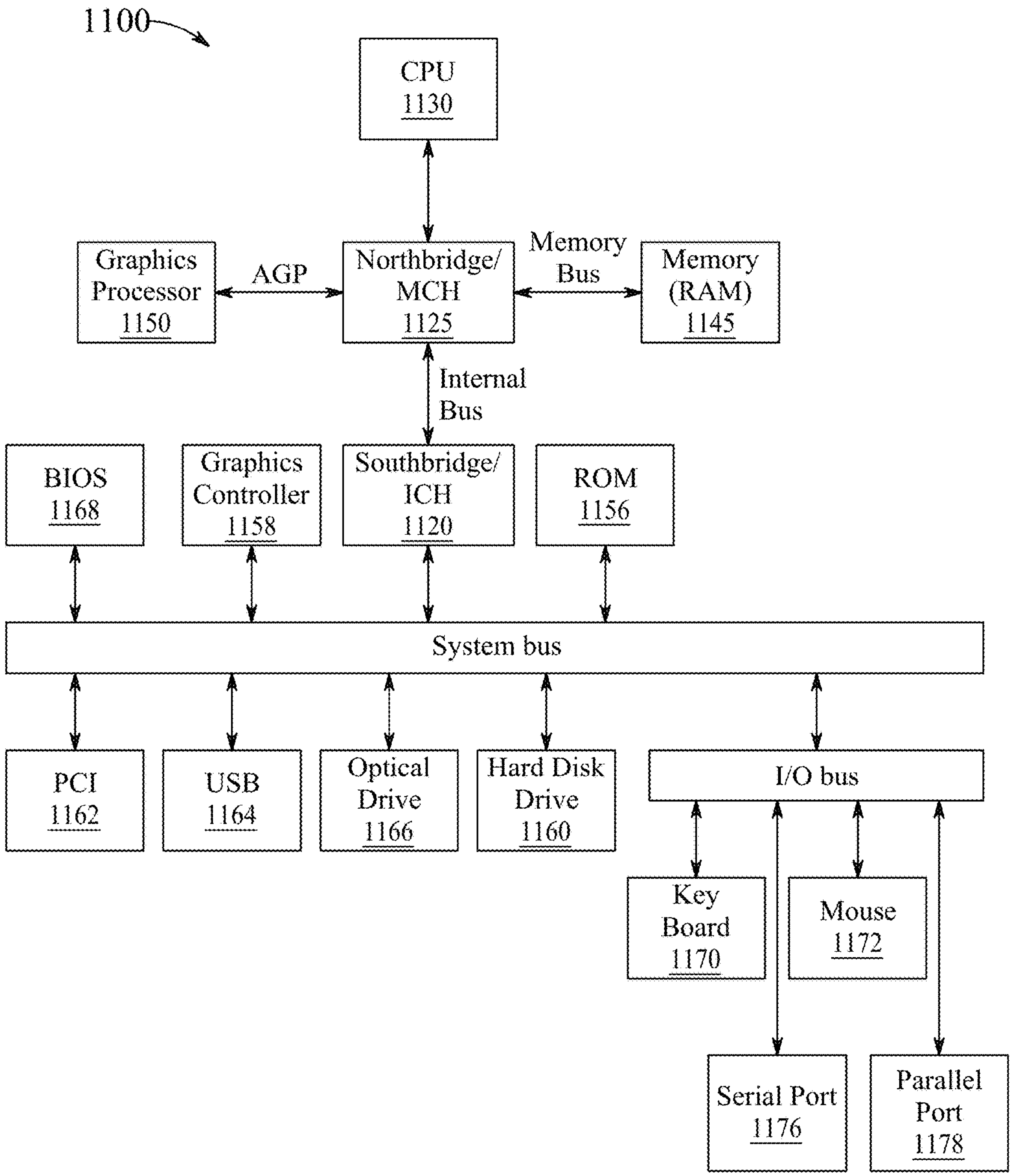
FIG. 11 is an exemplary schematic diagram of a data processing system used within the computing system, according to certain embodiments.

FIG. 11 shows a schematic diagram of a data processing system 1100, according to certain aspects of the present disclosure, for performing the functions of the exemplary computing unit. The data processing system 1100 is an example of a computer in which code or instructions implementing the processes of the illustrative aspects may be located.

In FIG. 11, data processing system 1100 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
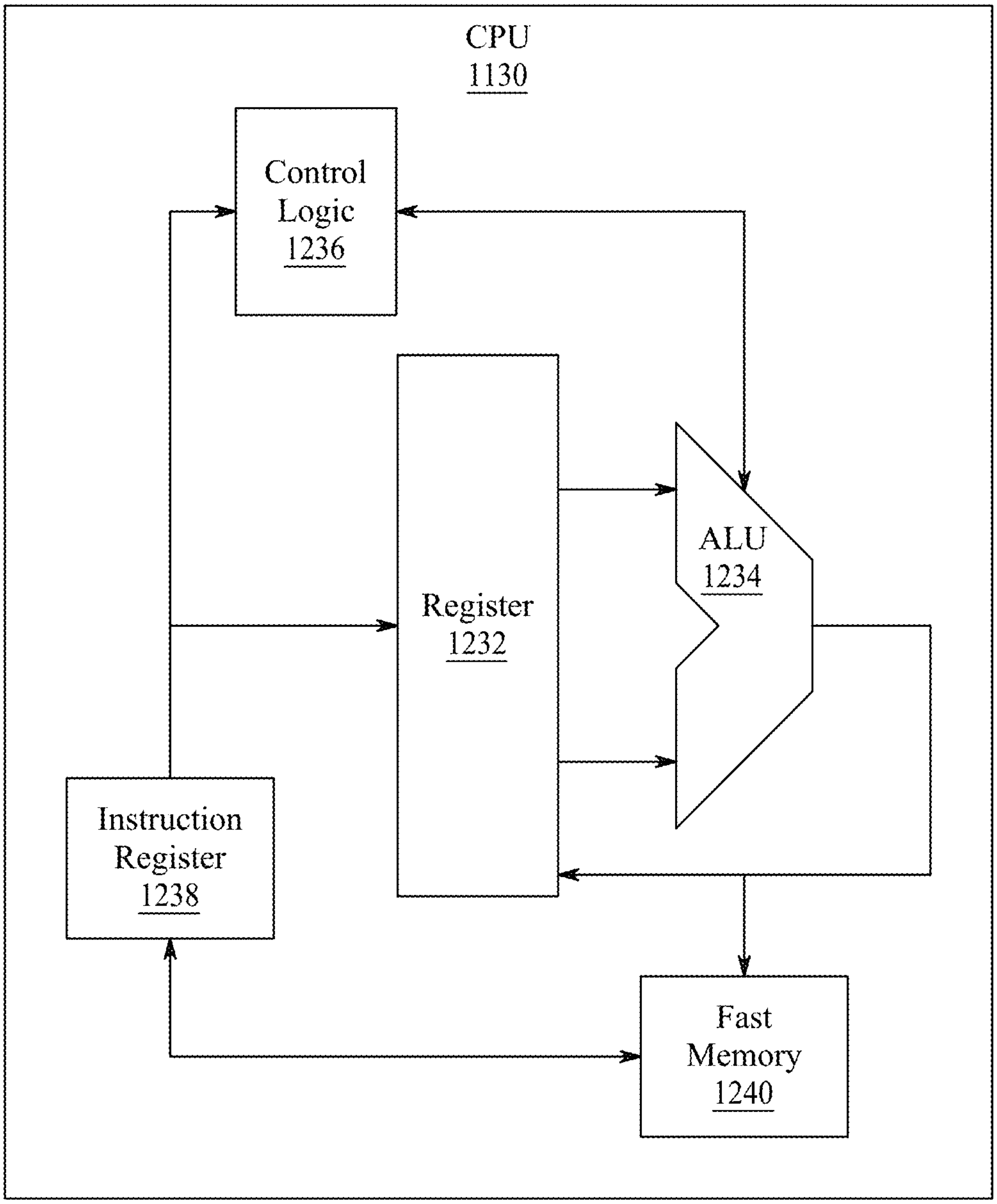
FIG. 12 is an exemplary schematic diagram of a processor used with the computing system, according to certain embodiments.

For example, FIG. 12 shows one implementation of CPU 1130, according to an aspect of the present disclosure. In one implementation, the instruction register 1238 retrieves instructions from the fast memory 1240. At least part of these instructions are fetched from the instruction register 1238 by the control logic 1236 and interpreted according to the instruction set architecture of the CPU 1130. Part of the instructions can also be directed to the register 1232. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232 and performs logical and mathematical operations on the loaded values according to the instructions. The results from these operations can be feedback into the register and/or stored in the fast memory 1240. According to certain implementations, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1100 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 888 through a PCI bus 1162.

The PCI devices may include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 13:
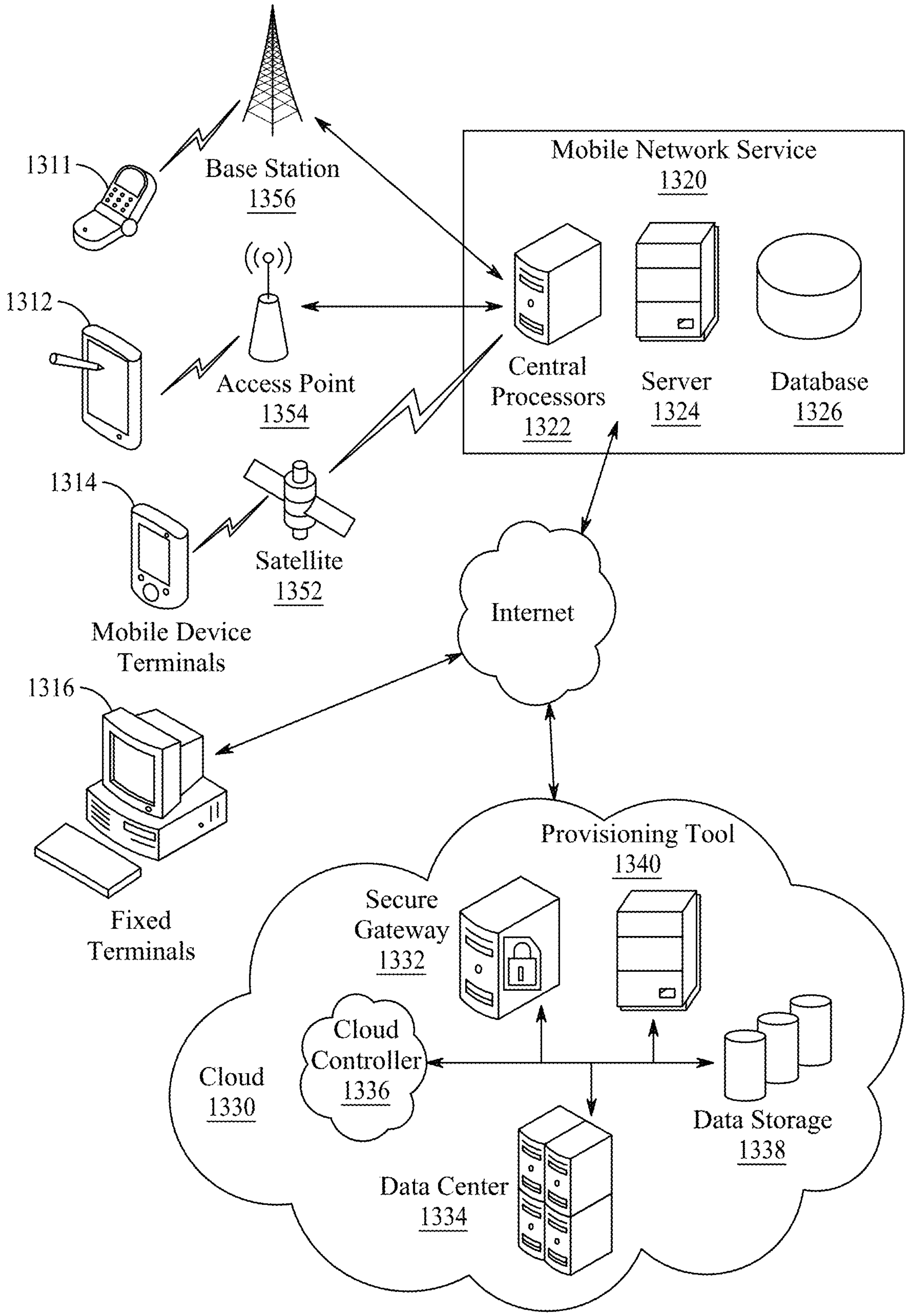
FIG. 13 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A system for estimating a seismic velocity of a subsurface layer of a geologic formation, comprising:

a seismic source located on a surface layer of the geologic formation, wherein the seismic source is configured to transmit shots of seismic waves into the geologic formation;

a plurality of seismic wave receivers located on the surface layer of the geologic formation, wherein each seismic wave receiver is configured to receive seismic waves refracted from a subsurface formation within the geologic layer and convert the secondary seismic waves into seismic traces;

a transmitter located within each seismic wave receiver, wherein the transmitter is configured to transmit the seismic traces;

an antenna configured to receive the seismic traces; and a signal processing circuitry configured to:

gather and stack the seismic traces;

determine a common midpoint of the stack of seismic traces;

determine a velocity of seismic waves of a first subsurface layer of the geologic formation from a geometrical evaluation of direct wave arrivals of the seismic traces;

select at least three seismic traces;

determine all combinations of seismic source/seismic wave receiver geometries of each of the three selected seismic traces, wherein the seismic source/seismic wave receiver geometries represent ray paths of a seismic signal as it travels through the first subsurface layer, refracts into a second subsurface layer, reflects from a third subsurface layer, refracts out of the second subsurface layer and is received by one of the seismic wave receivers;

form a weighted adjacency matrix W from the combinations;

form a weighted degree matrix $D^{-1}$ from the combinations;

calculate an inverse $(D^{-1})^{1/2}$ of the weighted degree matrix;

form a normalized weighted Laplacian matrix $$L_{sym}^{w}$$

by calculating $$L_{sym}^{w}(G) = I - \left(D_w^{-1}\right)^{\frac{1}{2}} W \left(D_w^{-1}\right)^{\frac{1}{2}},$$

where I is an identity matrix;

calculate eigenvalues of the normalized weighted Laplacian matrix;

determine which eigenvalue has a second largest absolute value of the eigenvalues;

select the eigenvalue having the second largest absolute value;

form a quartic regression polynomial of the eigenvalue having the second largest absolute value;

calculate a velocity of the seismic waves in a second layer of the geologic formation by fitting data points of the three selected seismic traces to each coefficient of the quartic regression polynomial; and a database of known velocities of seismic wave propagation in materials operatively connected to the signal processing circuitry, wherein the computing unit is configured to determine a material of the second layer of the geologic formation by matching the velocity of the seismic waves in the second layer to a record in the database of known velocities of seismic wave propagation in materials.

2. The system of claim 1, wherein the plurality of seismic wave receivers are a fixed array of seismic wave receivers and the seismic source is consecutively moved to each seismic wave receiver location, a shot is generated by the seismic source and a shot gather is recorded by the seismic wave receivers.

3. The system of claim 1, wherein the plurality of seismic wave receivers are a rolling array of seismic wave receivers in which the seismic source is consecutively moved to a seismic wave receiver location, a shot is generated by the seismic source and a subset of the seismic wave receivers are activated to receive the seismic waves.

4. The system of claim 1, wherein the plurality of seismic wave receivers are geophones.

5. The system of claim 1, wherein a weight of each ray path represents a distance travelled by the seismic wave as it travels through the first subsurface layer and the second subsurface layer of the geologic formation from the seismic source to one of the plurality of seismic wave receivers, such that:

a first ray path is defined as extending from a vertex at the seismic source to a vertex at a first refraction point on the second subsurface layer, wherein the weight of the first ray path is a distance measured parallel to the surface layer from the location of the seismic source to a projection of the first refraction point on the surface layer;

a second ray path is defined as extending from the vertex at the first refraction point on the second subsurface layer to a vertex at the reflection point of the third subsurface layer, wherein the weight of the second ray path equals a distance measured parallel to the surface layer from the projection of the refraction point on the surface layer to the common midpoint;

a third ray path is defined as extending from the vertex at the reflection point of the third subsurface layer to a vertex at a second refraction point on the second subsurface layer, wherein the weight of the third ray path equals a distance measured parallel to the surface layer from the common midpoint to a projection of the second refraction point on the surface layer;

a fourth ray path is defined as extending from the vertex at the second refraction point at the second subsurface layer to the one of the seismic wave receivers, wherein the weight of the fourth ray path equals a distance measured parallel to the surface layer from the projection of the second refraction point on the surface layer to the one of the seismic wave receivers; and a fifth ray path is defined as the distance parallel to the surface layer from the location of the seismic source to the location of the one of the seismic wave receivers.

6. The system of claim 5, wherein the velocity of the seismic waves of the first subsurface layer of the geologic formation is calculated by a geometrical evaluation of direct wave arrivals of the seismic traces.

7. The system of claim 5, wherein a velocity $\hat{V}_2$ of the seismic wave within the second subsurface layer is calculated, by the signal processing circuitry, by solving a quartic regression polynomial having the form:

$$\hat{V}_2 = \beta_0 + \beta_1 x + \beta_2 x^2 + \beta_3 x^3 + \beta_4 x^4,$$

where x is the eigenvalue having the second largest absolute value, and $\beta_0$, $\beta_1$, $\beta_2$, $\beta_3$ and $\beta_4$ are the coefficients of the quartic regression polynomial.

8. The system of claim 7, further comprising:

a map of the geologic formation configured to show the velocity of the seismic waves of the second subsurface layer and a material of the second subsurface layer for each seismic source/seismic wave receiver location, wherein the map is generated by:

conducting a geologic survey of the second subsurface layer of the geologic formation at a plurality of seismic source/seismic wave receiver locations;

determining, by the signal processing circuitry, the velocity of the seismic waves of the second subsurface layer and the material of the second subsurface layer for each seismic source/seismic wave receiver location; and generating, by the signal processing circuitry, the map.

9. A method for estimating a seismic velocity of a subsurface layer of a geologic formation, comprising:

transmitting shots of seismic waves into the geologic formation with a seismic source located on a surface layer of the geologic formation;

receiving, by a plurality of seismic wave receivers located on the surface layer of the geologic formation, seismic waves refracted by a subsurface formation within the geologic layer;

converting, by the plurality of seismic wave receivers, the secondary seismic waves into seismic traces;

transmitting, by a transmitter located within each seismic wave receiver, the seismic traces;

receiving, by an antenna connected to a computing unit including a signal processing circuitry, the seismic traces;

gathering and stacking, by a signal processing circuitry, the seismic traces;

determining a common midpoint of the stack of seismic traces;

selecting at least three seismic traces;

determining all combinations of seismic source/seismic wave receiver geometries of each of the three selected seismic traces, wherein the seismic source/seismic wave receiver geometries represent ray paths of a seismic signal as it travels through the first subsurface layer, refracts into a second subsurface layer, reflects from a third subsurface layer, refracts out of the second subsurface layer and is received by one of the seismic wave receivers;

forming a weighted adjacency matrix W from the combinations;

forming a weighted degree matrix $D^{-1}$ from the combinations;

calculating an inverse $(D^{-1})^{1/2}$ of the weighted degree matrix;

forming a normalized weighted Laplacian matrix $$L_{sym}^{w}$$

by calculating $$L_{sym}^{w}(G) = I - (D_w^{-1})^{\frac{1}{2}} W (D_w^{-1})^{\frac{1}{2}},$$

where I is an identity matrix;

calculating eigenvalues of the normalized weighted Laplacian matrix;

determining which eigenvalue has a second largest absolute value of the eigenvalues;

selecting the eigenvalue having the second largest absolute value;

forming a quartic regression polynomial of the eigenvalue having the second largest absolute value;

calculating a velocity of the seismic waves in a second layer of the geologic formation by fitting data points of the three selected seismic traces to each coefficient of the quartic regression polynomial; and determining, by the signal processing circuitry, a material of the second layer of the geologic formation by matching the velocity of the seismic waves in the second layer to a record in a database of known velocities of seismic wave propagation in materials.

10. The method of claim 9, comprising:

consecutively moving the seismic source to a seismic wave receiver location of a fixed array of seismic wave receivers, generating a shot by the seismic source and recording a shot gather by the seismic wave receivers.

11. The method of claim 9, comprising:

consecutively moving the seismic source to a seismic wave receiver location of a rolling array of seismic wave receivers, generating a shot by the seismic source and activating a subset of the seismic wave receivers to receive the seismic waves.

12. The method of claim 9, wherein the plurality of seismic wave receivers are geophones.

13. The method of claim 9, further comprising:

representing, by the signal processing circuitry, a weight of each ray path by a distance travelled by the seismic wave as it travels through the subsurface layers of the geologic formation from the seismic source to one of the plurality of seismic wave receivers, comprising:

defining a first ray path as extending from a vertex at the seismic source to a vertex at a first refraction point on the second subsurface layer;

determining the weight of the first ray path by measuring the distance parallel to the surface layer from the location of the seismic source to a projection of the first refraction point on the surface layer;

defining a second ray path as extending from the vertex at the first refraction point on the second subsurface layer to a vertex at the reflection point of the third subsurface layer;

determining the weight of the second ray path by measuring the distance parallel to the surface layer from the projection of the second refraction point on the surface layer to the common midpoint;

defining a third ray path as extending from the vertex at the reflection point of the third subsurface layer to a vertex at a second refraction point on the second subsurface layer, wherein the weight of the third ray path equals a distance measured parallel to the surface layer from the common midpoint to a projection of the second refraction point on the surface layer;

defining a fourth ray path as extending from the vertex at the second refraction point at the second subsurface layer to the one of the seismic wave receivers, wherein the weight of the fourth ray path equals a distance measured parallel to the surface layer from the projection of the second refraction point on the surface layer to the one of the seismic wave receivers; and defining a fifth ray path as the distance parallel to the surface layer from the location of the seismic source to the location of the one of the seismic wave receivers.

14. The method of claim 13, wherein the velocity $\hat{V}_2$ of the seismic wave within the second subsurface layer is calculated by solving a quartic regression polynomial having the form:

$$\hat{V}_2 = \beta_0 + \beta_1 x + \beta_2 x^2 + \beta_3 x^3 + \beta_4 x^4$$

where x is the eigenvalue having the second largest absolute value, and $\beta_0$, $\beta_1$, $\beta_2$, $\beta_3$ and $\beta_4$ are the coefficients of the quartic regression polynomial.

15. The method of claim 13, further comprising:

determining the ray paths for each of the three selected traces;

forming a weighted adjacency matrix W for each of the three selected traces from the ray paths;

forming a weighted degree matrix $D^{-1}$ for each of the three selected traces using the weights of each ray path;

calculating an inverse $(D^{-1})^{1/2}$ of each of the weighted degree matrices;

forming a normalized weighted Laplacian matrix $$L_{sym}^{w}$$

by calculating $$L_{sym}^{w}(G) = I - \left(D_w^{-1}\right)^{\frac{1}{2}} W \left(D_w^{-1}\right)^{\frac{1}{2}},$$

where I is an identity matrix for each of the three selected traces;

calculating the eigenvalues of each of the normalized weighted Laplacian matrices;

determining the eigenvalues of each of the normalized weighted Laplacian matrices which have the second largest absolute value;

selecting the eigenvalues having the second largest absolute value for each of the normalized weighted Laplacian matrices;

forming a quartic regression polynomial for each of the eigenvalues having the second largest absolute value;

calculating the velocity of the seismic waves in the second layer of the geologic formation for each of the three selected seismic traces by fitting data points to each quartic regression polynomial;

calculating a root-mean-square error of the velocity for each of the three selected seismic traces; and selecting a velocity having a lowest root-mean-square error as the velocity of the seismic waves in the second layer of the geologic formation.

16. The method of claim 9, further comprising:

conducting a geologic survey of the second subsurface layer of the geologic formation at a plurality of seismic source/seismic wave receiver locations, generating, by the signal processing circuitry, a map of the geologic formation, wherein the map shows the velocity of the seismic waves within the second subsurface layer and the material of the second subsurface layer for each seismic source/seismic wave receiver location.

17. The method of claim 9, further comprising:

determining a velocity of seismic waves of a first subsurface layer of the geologic formation from a geometrical evaluation of direct wave arrivals of the seismic traces.

18. A method for conducting a geologic survey of a subsurface layer of the geologic formation, comprising:

installing a seismic source on a surface layer of the geologic formation, wherein the seismic source is configured to transmit shots of seismic waves into the geologic formation;

installing a plurality of seismic wave receivers on the surface layer of the geologic formation, wherein each seismic wave receiver is configured to receive seismic waves refracted from a subsurface formation within the geologic layer and convert the secondary seismic waves into seismic traces;

installing a transmitter within each seismic wave receiver, wherein the transmitter is configured to transmit the seismic traces;

operatively connecting a computing unit including a memory having program instructions and an antenna configured to receive the seismic traces, wherein the signal processing circuitry is configured to execute the program instructions for:

gathering and stacking the seismic traces;

determining a common midpoint of the stack of seismic traces;

selecting at least three seismic traces;

determining all combinations of seismic source/seismic wave receiver geometries of each of the three selected seismic traces, wherein the seismic source/seismic wave receiver geometries represent ray paths of a seismic signal as it travels through the first subsurface layer, refracts into a second subsurface layer, reflects from a third subsurface layer, refracts out of the second subsurface layer and is received by one of the seismic wave receivers;

forming a weighted adjacency matrix W from the combinations;

forming a weighted degree matrix $D^{-1}$ from the combinations;

calculating an inverse $(D^{-1})^{1/2}$ of the weighted degree matrix;

forming a normalized weighted Laplacian matrix $$L_{sym}^{w}$$

by calculating $$L_{sym}^{w}(G) = I - (D_w^{-1})^{\frac{1}{2}} W (D_w^{-1})^{\frac{1}{2}},$$

where I is an identity matrix;

calculating eigenvalues of the normalized weighted Laplacian matrix;

determining which eigenvalue has a second largest absolute value of the eigenvalues;

selecting the eigenvalue having the second largest absolute value;

forming a quartic regression polynomial of the eigenvalue having the second largest absolute value;

calculating a velocity of the seismic waves in a second layer of the geologic formation by fitting data points of the three selected seismic traces to each coefficient of the quartic regression polynomial; and determining, by the signal processing circuitry, a material of the second layer of the geologic formation by matching the velocity of the seismic waves in the second layer to a record in a database of known velocities of seismic wave propagation in materials.

19. The method of claim 18, further comprising:

conducting the geologic survey of the second subsurface layer of the geologic formation at a plurality of seismic source/seismic wave receiver locations; and generating, by the signal processing circuitry, a map of the geologic formation, wherein the map shows the velocity of the seismic waves within the second subsurface layer and the material of the second subsurface layer for each seismic source/seismic wave receiver location.

20. The method of claim 19, further comprising:

conducting the geologic survey of the second subsurface layer of the geologic formation at a plurality of seismic source/seismic wave receiver locations by one of:

consecutively moving the seismic source to a seismic wave receiver location of a fixed array of seismic wave receivers, generating a shot by the seismic source and recording a shot gather by the seismic wave receivers; and consecutively moving the seismic source to a seismic wave receiver location of a rolling array of seismic wave receivers, generating a shot by the seismic source and activating a subset of the seismic wave receivers to receive the seismic waves.

* * * * *